US012770276B2

(12) United States Patent
Louchard

(10) Patent No.: US 12,770,276 B2
(45) Date of Patent: Oct. 20, 2026

(54) VEHICLE BASED THREAT DETECTION AND TRACKING WITH LWIR VIDEO

(71) Applicant: BAE Systems Information and Electronic Systems Integration Inc., Nashua, NH (US)

(72) Inventor: Eric M. Louchard, Miami, FL (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 302 days.

(21) Appl. No.: 18/528,217

(22) Filed: Dec. 4, 2023

(65) Prior Publication Data

US 2025/0182301 A1 Jun. 5, 2025

(51) Int. Cl.
*G06T 7/292* (2017.01)
*G06T 7/246* (2017.01)
(Continued)

(52) U.S. Cl.
CPC .............. *G06T 7/292* (2017.01); *G06T 7/248* (2017.01); *G06T 7/277* (2017.01); *G06T 7/55* (2017.01); *G06V 10/82* (2022.01); *G06V 20/41* (2022.01); *G06V 20/52* (2022.01); *G06T 2207/10016* (2013.01); *G06T 2207/10024* (2013.01);
(Continued)

(58) Field of Classification Search
CPC . G06T 2207/10016; G06T 2207/10024; G06T 2207/10048; G06T 2207/20081; G06T 2207/20084; G06T 2207/30212; G06T 7/248; G06T 7/277; G06T 7/292; G06T 7/55; G06V 10/25; G06V 10/255;
(Continued)

(56) References Cited

U.S. PATENT DOCUMENTS 8,026,842 B2 9/2011 Fox et al.
8,369,572 B2 2/2013 Stanfill et al.
(Continued)

FOREIGN PATENT DOCUMENTS

WO 2022074623 4/2022

OTHER PUBLICATIONS

International Search Report, PCT/US24/58215, mailed Jan. 31, 2025, 11 pages.
(Continued)

*Primary Examiner* — Kenny A Cese
(74) *Attorney, Agent, or Firm* — Sand, Sebolt & Wernow LPA; Gary McFaline

(57) ABSTRACT

A computer program product interacts with machine-readable mediums with instructions for automated target recognition. It captures a video of a specified region using detectors on a vehicle. Raw image frames from the video undergo pre-processing, followed by feeding through long and short-range target detection pipelines. Image frames are downscaled in the short-range pipeline, generating image windows and applying a trained convolutional neural network (CNN). Full resolution and non-redundant image chips are created. Detection region of interest (ROI) proposal lists are generated and analyzed with the CNN, producing frame detection lists with detected targets. These lists are stacked and processed using a multi-target Kalman filter, ultimately creating a track list of targets for monitoring.

20 Claims, 8 Drawing Sheets

(51) Int. Cl.

| | |
|---|---|
| ***G06T 7/277*** | (2017.01) |
| ***G06T 7/55*** | (2017.01) |
| ***G06V 10/82*** | (2022.01) |
| ***G06V 20/40*** | (2022.01) |
| ***G06V 20/52*** | (2022.01) |

(52) U.S. Cl.
CPC ............... *G06T 2207/10048* (2013.01); *G06T 2207/20081* (2013.01); *G06T 2207/20084* (2013.01); *G06V 2201/08* (2022.01)

(58) Field of Classification Search
CPC .... G06V 10/454; G06V 10/764; G06V 10/82; G06V 20/41; G06V 20/52; G06V 2201/08
See application file for complete search history.

(56) References Cited

U.S. PATENT DOCUMENTS

| | | | |
|---|---|---|---|
| 9,576,214 | B1 | 2/2017 | Zhang et al. |
| 9,778,351 | B1 | 10/2017 | Khosla et al. |
| 10,303,172 | B2 | 5/2019 | Hwang et al. |
| 10,339,387 | B2 | 7/2019 | Beard et al. |
| 10,495,753 | B2 | 12/2019 | Melvin et al. |
| 10,558,891 | B2 | 2/2020 | Wang et al. |
| 10,679,369 | B2 | 6/2020 | Hollander et al. |
| 10,699,139 | B2 | 6/2020 | Chen et al. |
| 11,205,274 | B2 | 12/2021 | Gao et al. |
| 11,398,084 | B2 | 7/2022 | Che |
| 2010/0283662 | A1 | 11/2010 | Fox et al. |
| 2015/0358560 | A1* | 12/2015 | Boulanger ................ G06T 5/50 348/164 |
| 2019/0378287 | A1 | 12/2019 | Hollander et al. |
| 2021/0286050 | A1* | 9/2021 | Achour ................... G01S 7/415 |
| 2021/0291980 | A1 | 9/2021 | Liou et al. |
| 2022/0197281 | A1 | 6/2022 | Chen et al. |
| 2022/0283311 | A1* | 9/2022 | Zhou ..................... G01S 7/4817 |
| 2023/0311863 | A1* | 10/2023 | Lotan .................... B60W 10/18 701/26 |

OTHER PUBLICATIONS

Pierre V. Villeneuve et al., Improved Matched-Filter Detection Techniques, SPIE Conference on Imaging Spectrometry V, Jul. 1999, p. 278-285, vol. 3753, Denver, Colorado.

* cited by examiner

VEHICLE BASED THREAT DETECTION AND TRACKING WITH LWIR VIDEO

STATEMENT OF GOVERNMENT INTEREST

This invention was made with government support under Prime Contract No. H92401 20 C 0007 awarded by the Department of Defense. The government has certain rights in the invention.

TECHNICAL FIELD

The present disclosure relates generally to automated target recognition and classification. More particularly, in one example, the present disclosure relates to threat detection and tracking utilizing long wave infrared cameras and convolutional neural-networks. Specifically, in another example, the present disclosure related to system, method for vehicle based threat detection, tracking with long wave infrared cameras mounted on top of vehicles utilizing pixel based detectors, and image window based detectors to recognize, identify, and track both long and short-range targets.

BACKGROUND ART

Target detection identification and tracking systems have numerous military and non-military based applications. Specifically, automated target recognition (ATR), identification and tracking can be used in unmanned aerial vehicles such as drones and the like, automated driving systems including self-driving vehicles, and in military vehicles to locate, identify and track potential threats to the vehicle and or personnel nearby or within the vehicle.

Typically, these systems utilize one or more cameras and/or detectors to locate and identify nearby objects and or people and use tracking algorithms to determine characteristics of the detected items to try to predict activity based on those detected characteristic. For example, automated driving systems may utilize one or more sensors to detect other vehicle, pedestrians, road lanes, road signs, or other objects or obstructions in the lane of travels. Unmanned vehicles, such as drones, may detect obstacles, the horizon, elevation, and or specific targets to follow and/or avoid. Military applications may utilize similar or enhanced systems to detect enemy personnel, vehicles, or the like or further to detect, identify, and counter or avoid threats such as incoming projectiles or other hostile objects.

As technology improves, so do these ATR systems. In particular, rapid advances in convolutional neural-networks (CNNs) may have made it possible to detect objects quickly and easily in video streams both with RGB video and or infrared cameras. The CNN may be customized and or trained to detect objects based on target size, position, movement and/or thermal signature, particularly when utilizing infrared cameras.

Despite these advances in CNNs, detection most existing systems are highly accurate but are not suitable for real time use. For example, one well-known systems that is fast enough real-time use is a system known as YOLO (you only look once) however, most YOLO systems are designed for low resolution video with a window-based region interest systems which can serve to limit the target size that can be detected. Further, a limited number of windows may be analyzed with the CNN before the system slows down to below real-time speeds. Thus, existing systems are limited in their ability to be used in real-time and/or their abilities for true day and night dual capability, either by their processing speed or by their limitations on video resolution and/or window based anchor box systems.

SUMMARY OF THE INVENTION

The present disclosure addresses these and other issues by providing a high-resolution long wave infrared imagining system utilizing a custom CNN with a window-based detector for targets at a short-range and a pixel-based detector for longer range targets.

In one aspect, an exemplary embodiment of the present disclosure may provide an automated target recognition system comprising: a first detector carried by a vehicle; a second detector carried by the vehicle; at least one processor capable of executing logical functions in communication with the vehicle, the first detector, and the second detector; and at least one non-transitory computer readable storage medium having instructions encoded thereon that, when executed by the processor, implements operations to detect, classify, and track a target, the instructions including: capture a video of a region of interest (ROI) with at least one of the first and second detectors; pre-process raw image frames from the video to prepare the video for analysis; feed the pre-processed image frames through a long range target detection (LRTD) pipeline and a long range motion detection (LRMD) pipeline; generate a frame array from each of the LRTD and LRMD pipelines; feed the raw image frames from the video through a short range target detection (SRTD) pipeline; downscale the raw image frames in the SRTD pipeline; generate a set of image windows from the raw image frames in the SRTD pipeline; group the set of image windows into a batch and apply a trained convolutional neural network (CNN) to the batch; create a batch of full resolution image chips from the SRTD pipeline batch; create a batch of non-redundant image chips from the LRTD and LRMD pipelines; generate detection ROI proposal lists; analyze the ROI proposal lists with the CNN to create a plurality of frame detection lists; detect at least one target in the frame detection lists; stack the frame detection lists; and apply a multi-target Kalman filter to the stacked lists to generate a track list of targets to be tracked. This exemplary embodiment or another exemplary embodiment may further provide wherein the analyzing the ROI proposal lists with the CNN further comprises: analyze region proposals from the ROI proposal lists to filter out clutter using a heatmap; and run all region proposals that pass a predetermined threshold through a non-maximal suppression routine to create the plurality of frame detection lists. This exemplary embodiment or another exemplary embodiment may further provide wherein stacking the frame detection lists further comprises: combine detections from multiple frame detection lists into groups based on azimuth and elevation and corrected for motion; calculate persistence of the detection groups; calculate shape consistency from the detection groups; and generate metadata for the groups including range, position, and shape error of the detected targets. This exemplary embodiment or another exemplary embodiment may further provide wherein the multi-target Kalman filter is only applied to detected targets that pass a predetermined threshold for persistence and shape consistency. This exemplary embodiment or another exemplary embodiment may further provide wherein tracking a target with the multi-target Kalman filter further comprises: continuously track the targets until the target meets a predetermined threshold for invisibility; and delete the target from the list of targets to be tracked. This exemplary embodiment or another exemplary embodiment may further provide wherein stacking the frame detection lists occurs continuously. This exemplary embodiment or another exemplary embodiment may further provide wherein the first detector further comprises: a red green blue (RGB) video camera. This exemplary embodiment or another exemplary embodiment may further provide wherein the second detector further comprises: a long-wave infrared (LWIR) video camera. This exemplary embodiment or another exemplary embodiment may further provide wherein the instructions further comprise: detecting a first target with the RBG video camera; and detecting a second target with the LWIR video camera. This exemplary embodiment or another exemplary embodiment may further provide wherein the first target detected further comprises: at least one of a target vehicle and a dismount within 150 meters of the first detector. This exemplary embodiment or another exemplary embodiment may further provide wherein the second target detected further comprises: at least one of a vehicle, a dismount, and an unmanned aerial vehicle (UAV) further than 150 meter from the second detector. This exemplary embodiment or another exemplary embodiment may further provide wherein targets are detected using both the first and second detectors during the day and using only the second detector at night. This exemplary embodiment or another exemplary embodiment may further provide wherein the vehicle further comprises: one of a land-based vehicle, sea-based vessel, and an aircraft. This exemplary embodiment or another exemplary embodiment may further provide wherein the targets to be tracked further comprise: at least one of a vehicle, a dismount, and an unmanned aerial vehicle (UAV).

In another aspect, an exemplary embodiment of the present disclosure may provide a method of automated target recognition and tracking comprising: filming a video of a region of interest (ROI) with at least one video detector; processing the video of the region of interest with at least one of a long range target detection pipeline, a long range motion detection pipeline, and a short range target detection pipeline to detect at least one target in the video of the ROI; applying a convolutional neural network to the video of the ROI to identify and classify the at least one target therein; generating at least one frame detection list containing data about the at least one target; calculating persistence and shape consistency of the at least one target; and applying a multi-target Kalman filter to the at least one frame detection list to generate a track list including at least one target to be tracked from the at least one target detected in the video of the ROI. This exemplary embodiment or another exemplary embodiment may further provide wherein filming the ROI with at least one detector further comprises: filming the ROI with a first detector; and filming the ROI with a second detector. This exemplary embodiment or another exemplary embodiment may further provide filming the ROI with both the first detector and the second detector during the day; and filming the ROI with only the second detector during the night. This exemplary embodiment or another exemplary embodiment may further provide wherein the first detector further comprises: a red green blue (RGB) video camera. This exemplary embodiment or another exemplary embodiment may further provide wherein the second detector further comprises: a long-wave infrared (LWIR) video camera. This exemplary embodiment or another exemplary embodiment may further provide continuously tracking the at least one target until the target meets a predetermined threshold for invisibility; and deleting the target from the list of targets to be tracked.

In yet another aspect, an exemplary embodiment of the present disclosure may provide a computer program product including one or more non-transitory machine-readable mediums encoded with instructions that when executed by one or more processors cause a process to be carried out for automated target recognition and tracking, the process comprising: capturing, via at least one detector, a sequence of image frames that define a video depicting a region of interest (ROI); processing the video with at least one of a long range target detection (LRTD) pipeline, a long range motion detection (LRMD) pipeline, and a short range target detection (SRTD) pipeline to detect at least one target in the video in or near the ROI; applying a convolutional neural network (CNN) to the video to identify and classifying the at least one target therein; generating at least one frame detection list containing data about the at least one target; calculating persistence and shape consistency of the at least one target; and applying a multi-target Kalman filter to the at least one frame detection list to generate a track list including the at least one target, wherein the at least one target is to be tracked in response to detection in the video of the ROI, and effecting the at least one target to be tracked.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
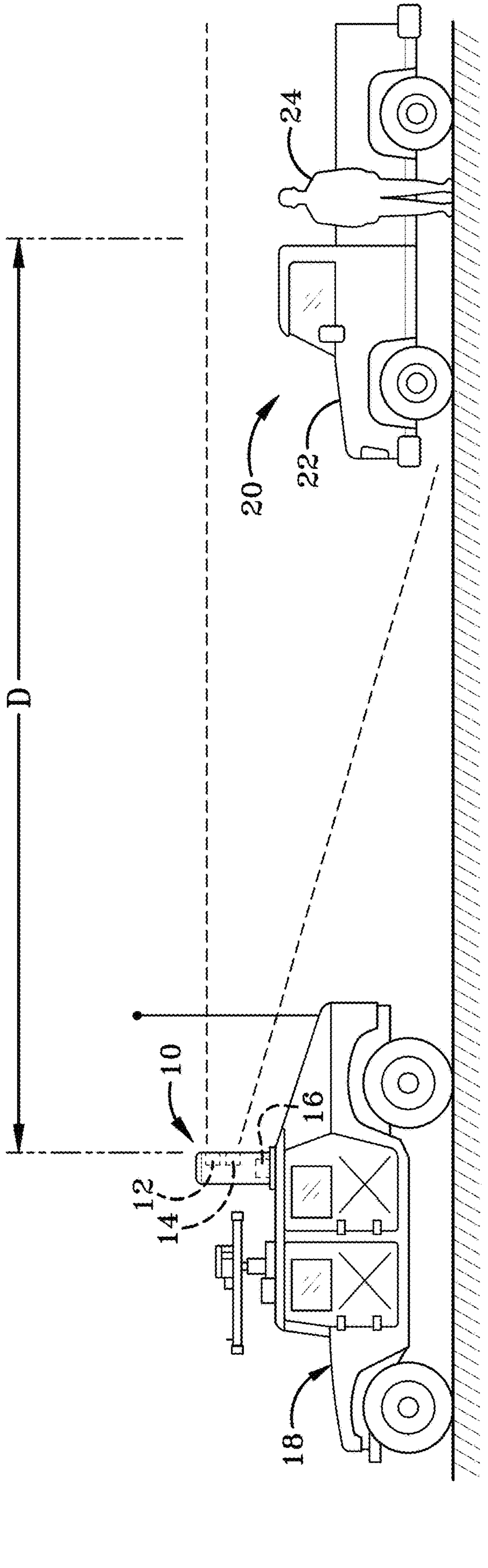
FIG. 1 (FIG. 1) is an exemplary side elevation view of an automated target recognition system according to one aspect of the present disclosure.

With reference to FIG. 1 an automated target recognition system (ATR) is shown and generally indicated at reference 10. ATR system 10 may generally include at least one detector, such as first detector 12. Typically, ATR system 10 is contemplated for use with two or more detectors, such as first detector 12 and second detector 14. ATR system 10 may further include at least one processor 16 in communication with first and second detectors 12 and 14 and in further communication with additional processing system, storage media, and/or other similar components as dictated by the desire implementation. It is to be understood that the processing could be performed entirely on a platform, such as vehicle 18. Or, the processing performed by processor could be performed at a location different from the vehicle 18. If processing is performed off-vehicle, then a data link or communication link is needed to link the processor with the sensors.

ATR system 10 may generally be carried by a vehicle 18, shown here as an all-terrain vehicle or truck, however, vehicle 18 may be any suitable vehicle as discussed further below including deployment on land, sea, airborne or space.

At its most basic, ATR system 10 may be utilized to detect, classify, and/or track a target, such as target 20, spaced at a distance away from ATR system. This distance is show as distance 'D' in FIG. 1.

As shown and discussed herein target 20 may be a targeted vehicle 22, a target person 24 (also referred to herein as a "dismount"), or any combinations of similar vehicles or persons as discussed further herein.

As discussed in more detail below, first and second detectors 12 and 14 are contemplated to allow ATR system 10 to be utilized in both day and night conditions using a combination of infrared and/or RGB (red green blue) video detectors. Accordingly, first and second detectors 12 and 14 may be any suitable visual detectors including RGB video cameras, long wave infrared (LWIR) video, mid-wave infrared (MWIR) video or any other suitable visual detectors or suitable combinations thereof. According to one aspect, first detector 12 may be an RGB video camera and second detector 14 may be a LWIR camera. Similarly, first and second detectors 12 and 14 may be scaled and/or mounted within ATR system 10 to provide a wide angle or 360-degree view around vehicle 18 as discussed further herein. Accordingly, it will be understood that first and second detectors 12 and 14 may further include any suitable hardware and or mounting equipment such as gimbals and the like to maintain stability in the detectors while vehicle 18 is operated which further allowing movement of first and second detectors 12 and 14 as desired. As mentioned above, additional detectors beyond first and second detectors 12 and 14 may be included as dictated by the desire implementation of ATR system 10.

Processor 16 may be one or more suitable processors or processing units, including one or more logics or logic controllers along with one or more microchips and/or microcontrollers and may be in further communication with, or may otherwise include, one or more storage media. Processor 16 may be utilized to simultaneously control the operations of first and second detectors 12 and 14 while further being operable to run a series of instructions thereon the analyze, detected, classify and/or track targets 20 using the methods and algorithms described further herein.

In will be understood that each of first detector 12, second detector 14, and/or processor 16 may be, or may further include, legacy components and/or systems which may be adapted for use with the ATR system 10 described herein. According to one aspect, first detector 12, second detector 14, and/or processor 16 may be existing components already carried or otherwise integrated in to a vehicle 18 which may be modified or updated to include the operation and functionality described further herein in. According to another aspect, each of these components may be new dedicated components specifically designed and/or installed for use with ATR system 10 as described further herein.

Vehicle 18 can be any suitable vehicle including land-based vehicles, sea based vessels, aircraft, including manned and unmanned aircraft, or any other suitable or desired vehicle as dictated by the implementation of ATR system 10. Vehicle 18 may further be a stationary installation, including permanent and temporary installations, as desired. According to one example the vehicle 18 may in fact be a platform or building and ATR system 10 may installed thereon/therein as a security or monitoring system.

As mentioned above and described further herein, target 10 including vehicle targets 22 and/or target persons 24 may be any type of target and may include land based vehicles, sea-based vessels, aircraft, including manned and unmanned aircraft, weapons systems and/or projectiles, or any other suitable or desired target profile as dictated by the implementation of ATR system 10.

Figure 2:
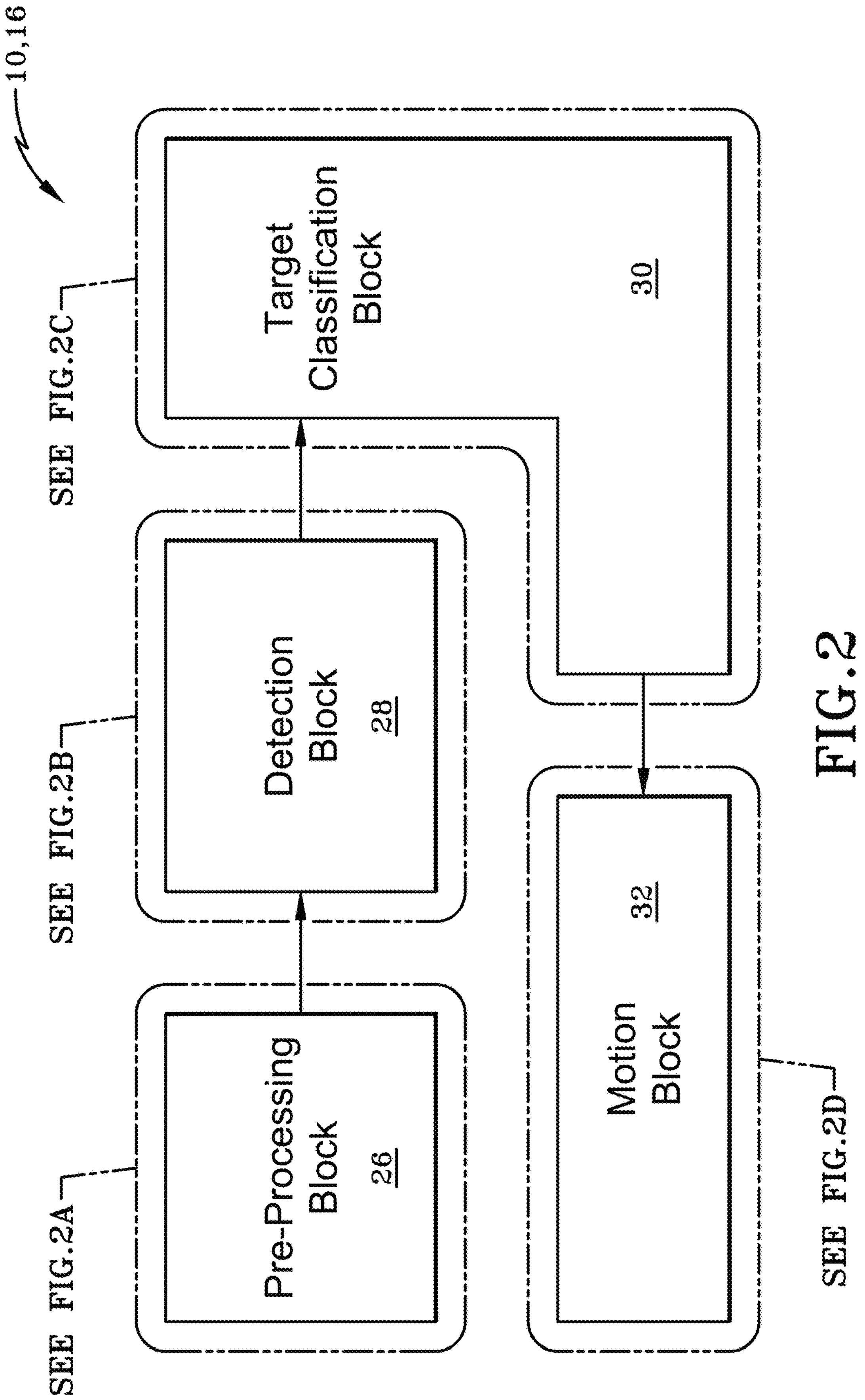
FIG. 2 (FIG. 2) is a block diagram of a convolutional neural-network (CNN) automated target recognition (ATR) system according to one aspect of the present disclosure.

With reference to FIG. 2 ATR system, 10 will generally be understood to operate with a convolutional neural-network (CNN) which may be utilized or trained in detection and recognition of targets of interest. The CNN is a type of artificial neural network specifically designed for processing grid-like data, such as images and videos. It is useful for tasks like image recognition, object detection, and computer vision. CNNs are inspired by the organization of the animal visual cortex, which has specialized areas for processing visual information. Convolution is the fundamental operation in a CNN. A convolutional layer consists of filters (also called kernels) that slide over the input image to perform convolutions. Each filter is a small matrix that extracts features from different parts of the input. Convolution helps the network detect patterns such as edges, textures, and shapes. After convolution, an activation function like ReLU (Rectified Linear Unit) is applied element-wise to introduce non-linearity in the network. This helps the model learn complex patterns and relationships in the data. Pooling layers downsample the spatial dimensions of the input while retaining essential information. Some exemplary pooling operations include max-pooling (selecting the maximum value in a local region) and average pooling (calculating the average value in a local region). After several convolutional and pooling layers, one or more fully connected layers are typically added. These layers connect every neuron in one layer to every neuron in the next layer, enabling the model to learn high-level features and make predictions. Before passing the output of the convolutional and pooling layers to the fully connected layers, the data is flattened into a vector. A softmax activation function may be used to produce a probability distribution over the different classes in a classification task. There may be a loss function that computes the error or difference between the predicted outputs and the actual labels. Some exemplary loss functions for classification tasks include categorical cross-entropy and mean squared error. To train the CNN, an optimization algorithm (e.g., stochastic gradient descent or another) may be used to minimize the loss function by adjusting the model parameters (weights and biases). This process involves backward propagation to update the weights in the network.

As described herein ATR system 10 is contemplated for use in military applications with targets of interest including vehicles, dismounts (i.e. persons and/or pedestrians) and unmanned aerial vehicles (UAV). Although contemplated for use in these types of detections in military applications it will be understood that ATR system 10 may be adapted for use in any suitable automated target detection and recognition system as dictated by the desired implementation, including civilian and/or private applications such as, automated driving systems, security systems, facility-monitoring systems or the like.

Generally, the CNN-based ATR system can continuously process incoming data, detect targets of interest accurately, and assist in making informed decisions based on the detected targets, ultimately enhancing situational awareness and aiding security and surveillance efforts. Generally, some embodiments of ATR system 10 may gather a diverse dataset containing images with examples of vehicles, dismounts (persons and pedestrians), and UAVs. ATR system 10 may annotate the images, indicating the regions of interest (ROIs) for each target category. ATR system 10 may pre-process the images, including resizing them to a consistent size, normalizing pixel values, and potentially augmenting the data to increase the diversity of the dataset. Augmentation techniques may include rotation, flipping, scaling, and changes in lighting conditions. ATR system 10 may include a CNN architecture having multiple convolutional layers for feature extraction, followed by pooling layers for down-sampling and reducing spatial dimensions. Some embodiments may use deeper architectures like ResNet, VGG, or custom-designed architectures tailored to a specific ATR task or application-specific need. The CNN may be trained using the preprocessed and annotated dataset. During training, the CNN learns to extract features that are relevant for distinguishing between different target classes (vehicles, dismounts, UAVs). The model can be trained to minimize a suitable loss function, such as categorical cross-entropy. ATR system 10 may validate the model on a separate dataset to assess its performance. ATR system 10 may fine-tune the model based on the validation results, adjusting hyperparameters or modifying the architecture to achieve better accuracy and generalization. Once the model is trained and validated, ATR system 10 may use it for inference on new unseen data. Input the images into the trained CNN, and the model will output predictions with bounding boxes and associated probabilities for the presence of each target class. ATR system 10 may apply post-processing techniques to refine the predictions, remove duplicate detections, and filter false positives. Common techniques include non-maximum suppression (NMS) to eliminate redundant detections and setting a threshold on the confidence scores to filter out low-confidence detections. The trained CNN model may be integrated into the broader ATR system, allowing it to process real-time data streams, such as video feeds or image sequences. The ATR system will use the CNN's output to identify and track targets of interest (vehicles, dismounts, UAVs) and provide actionable insights or alerts accordingly.

ATR system 10 in one embodiment includes a suite of algorithms and/or processes that use a pixel based detector for long range targets and an image window based detector for shot range targets. These detectors may be any suitable detector such as those described above with relation to first and second detectors 12 and 14. As contemplated described herein a first detector may be an RGB video detector utilized for short-range image window based detections and second detector 14 may be LWIR video for long-range targets as a pixel-based detector. The suite of algorithms and/or processes are shown in FIG. 2 as general blocks which will be described in further detail below. More particularly, ATR system 10 may utilize processor 16 arranged in a pre-processing block 26, a detection block 28, a target classification block 30 and a motion block 32. The functionality and processes of each block, as described below may work in unison to allow ATR system 10 to detect, identify, and track targets 20 which may further allow determination and/or classification of the targets which may be further used in threat avoidance, countermeasures, targeting systems, obstacle avoidance or the like.

ATR system 10 as mentioned above typically may be divided into short-range and long-range target windows or target areas. While this case may vary in terms of defined position and relevant to the vehicle 18 utilizing ATR system 10, these detection zones may be delineated by distance D as seen in FIG. 1. In one example, the short-range targets are at or less than approximately 150 meters from vehicle 18 and long range targets are located at distances greater than 150 meters from vehicle 18. In addition, or alternatively, these zones may be physically delineated by physical markers with the horizon being contemplated as the standard physical marker. Put another way, targets such as UAVs and other airborne targets are typically expected to be detected above the horizon or just slightly below the horizon at extended distances and would be typically detected utilizing the long range detector. While vehicles and dismounts would typically be detected below the horizon. Where there is an overlap between these detector regions, redundant detection may be filtered out through suppression of ROI boxes with lower classification scores as described further below.

Figure 2A:
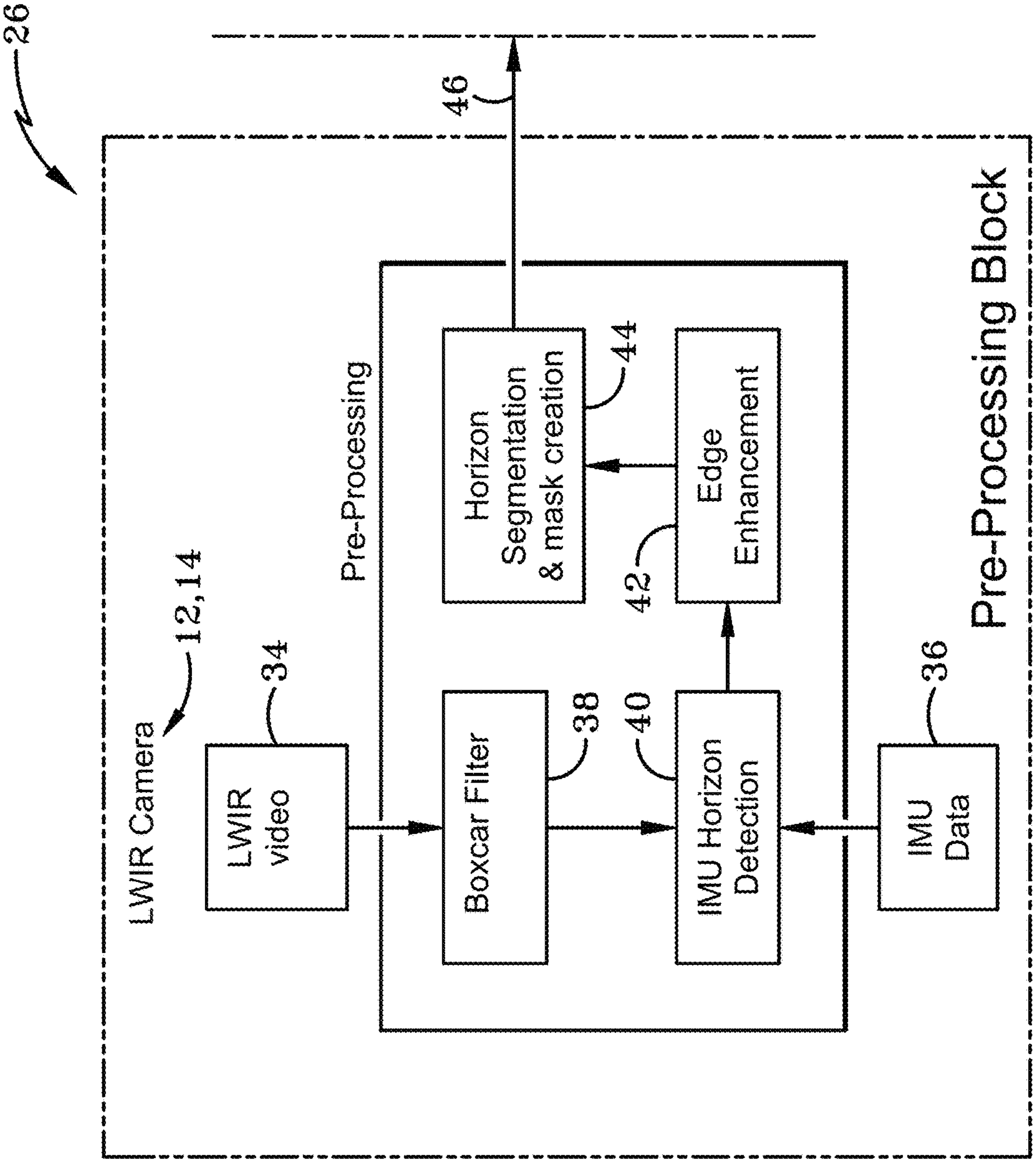
FIG. 2A (FIG. 2A) is a pre-processing block of the CNN ATR system of FIG. 2 according to one aspect of the present disclosure.

With reference to FIG. 2A, the pre-processing block 26 of ATR system 10 is shown and will be described in more detail. The first step of processing an image with ATR system 10 is to pre-process the raw image frame to prepare them for algorithm analysis. Accordingly, the input into the pre-processing block 26 includes a video taken by first and or second detectors 12 and 14. As shown here, LWIR camera may produce LWIR video 34 to be fed into the pre-processing block 26 into a filter that in this example is a 3×3 boxcar filter 38. However, other sized boxcar filters are possible. A 3×3 boxcar filter, also known as a mean filter or average filter, is a simple filter used for image processing. When applied to an image in the context of a CNN-based ATR system 10, the 3×3 boxcar filter may be used for a type of image smoothing or blurring operation. In one exemplary operation, begin by placing the 3×3 boxcar filter at the top-left corner of the image. Then, compute the element-wise product between the filter and the corresponding pixels in the 3×3 region of the image it covers. Then, sum up these products. Then, divide the sum obtained above by the total number of elements in the 3×3 filter (which is 3×3=9). This average value is then assigned to the center pixel of the 3×3 region. The, slide the 3×3 boxcar filter to the right (or left) by one pixel and repeat the steps above. Continue this process, sliding the filter across the entire image, computing averages for each 3×3 region, until the entire image has been processed. The 3×3 boxcar filter calculates the mean (average) of pixel values in a local neighborhood, which helps smooth out the image and reduce noise. The resulting image will have a blur effect, reducing sharp transitions and enhancing uniformity in the pixel values.

This boxcar filter 38 will reduce graininess and speckle in any video input 34 and may be turned off if the camera already utilizes a smoothing filter or similar smoothing of the video. Once the video is processed through boxcar filter 38 the horizon may be detected using an inertial measurement unit (IMU) horizon detection filter 40 fed with IMU data 36. The IMU unit (not shown) in one example is a part of the vehicle and the IMU data 36 is fed to the ATR system. In another example the IMU unit is part of the ATR system. In one example, detecting the horizon in an image using the IMU horizon detection filter involves utilizing data from the IMU, which typically provides information about the orientation and tilt of the sensor, camera or device in three-dimensional space. By combining this orientation information with the preprocessed image (e.g., after applying the boxcar filter), it's possible to determine the horizon line accurately. In one exemplary operation, the IMU continuously measures various parameters related to the orientation of the device, such as pitch, roll, and yaw. These measurements provide insights into how the camera or device is oriented in relation to gravity and the ground. Then, the IMU data is aligned with the preprocessed image. Ensure that the orientation data from the IMU corresponds to the moment the image was captured. The pitch angle from the IMU data may be particularly relevant for horizon detection. The pitch angle indicates the tilt of the sensor/camera/device with respect to the ground plane. Then, use the pitch angle to estimate the position of the horizon line in the image. A high positive pitch angle indicates that the sensor/camera is pointing downwards, while a high negative pitch angle indicates it is pointing upwards. The horizon is typically at the midpoint between these extremes. Based on the estimated position of the horizon, overlay a horizontal line on the image at that position. This line represents the detected horizon.

In another example, the IMU horizon detection filter 40 may initially assume that the horizon is at the center of an image frame. Which as show in FIG. 2A for an LWIR camera with the resolution of 1200×1920 pixels with approximate the horizon at row 600 with the pitch offset based on an IMU pitch value in the navigation data, from there the pixel offset of the horizon may be calculated utilizing a formula-Altitude offset from pitch: vertical field of view (degrees)/#row pixels. An example is illustrated below:

Altitude offset from pitch: 75 degress/1200 row pixels = 0.0625 degrees per pixel In this example a camera has a vertical field of view of 75 degrees, however the field of view may differ depending on the application specific needs of system 10. For example, if the IMU pitch shows −3.125 the horizon line is higher by 50 pixels in the image (i.e. at row 550). The roll data from the IMU may then be used to rotate the horizon line using the center column pixel as an axis of rotation.

Once the horizon is detected and calculated, long-range video segments may be processed, according to one example, with a 2D order statistic convolution filter that creates an edge image. Using a 2D order statistic convolution filter to create an edge image from long-range video segments after determining the horizon involves, according to one example, a process that enhances the edges in the video, making them more prominent and aiding in further analysis or feature extraction. In one exemplary operation, an order statistic convolution filter is a type of nonlinear filter that operates on an image to enhance certain features, such as edges. It may use a sliding window (typically square or rectangular but other shapes are possible) to traverse the image and, at each location, rearranges the pixel values within the window based on a predefined order (e.g., sorting them in ascending order). The result is typically a modified pixel value based on the desired order. In the context of long-range video segments, the video frames are broken down into smaller sections or segments. These segments are then processed individually using the order statistic convolution filter. The order statistic convolution filter is chosen for its ability to enhance edges in the image. Edges are abrupt changes in pixel intensity and are crucial in object detection and recognition. By using this filter, it may highlight these edges, making them more distinguishable for subsequent analysis. For each segment of the video, the order statistic convolution filter processes the pixels in a sliding window. The filter reorganizes the pixel values based on a specific order (e.g., taking the maximum, minimum, median, etc.). In the context of edge enhancement, the maximum or minimum operation is often used to emphasize the intensity variations associated with edges. In this example, after processing each segment using the order statistic convolution filter, an edge-enhanced image is generated. This image highlights the edges present in the original video segment, making them more visible and distinguishable. The resulting edge-enhanced images from each segment can be aggregated to form a complete edge image that represents the edges across the entire long-range video.

In one example of the process for using a 2D order statistic convolution filter to create an edge image from long-range video segments, the kernel (dom) is a vector [1×9], which helps maximize vertical lines. In this example the minimum order (minOrder) for the filter is 1 and the maximum (maxOrder) is 9.

$$\mathrm{Min}Img = ordfilt2(\mathrm{mini}cube, \mathrm{min}Order, dom, \text{'symmetric'});$$

$$\mathrm{Max}Img = ordfilt2(\mathrm{mini}cube, \mathrm{max}Order, dom, \text{'symmetric'}); \text{ and}$$

$$\text{edge\_image} = \mathrm{Max}Img - \mathrm{Min}Img$$

This is shown in the edge enhancement filter 42 with the resulting edge image being combined with a long range segment mini-cube array to produce a two-band image which may be sent to the long range target detection cell box as discussed further below. In one example, combining the resulting edge-enhanced images with a long-range segment mini-cube array to produce a two-band image involves integrating the enhanced edge information with the original video data in a structured manner. This process aims to create a representation that encapsulates both edge features and the original data for further analysis or visualization. In one exemplary operation, the edge-enhanced images, obtained using the order statistic convolution filter, emphasize the edges present in the original video segments. These images highlight intensity variations, aiding in the identification and analysis of important features and boundaries. The long-range segment mini-cube array may comprise multiple mini-cubes, each representing a segment of the original video. These mini-cubes encapsulate pixel-level information (intensity values, color, etc.) for each segment and are arranged in a structured array. The edge-enhanced images and the long-range segment mini-cube array are combined to produce a two-band image. The process involves integrating the edge-enhanced information into the mini-cube array while maintaining the original data. The resulting two-band image is essentially a composite representation. One band contains the edge-enhanced information, highlighting the edges, while the other band preserves the original data from the mini-cube array. This combination results in edge-enhanced information that is useful for feature detection, object recognition, and boundary identification. Enhancing edges helps in making these features more distinguishable and can significantly aid subsequent analytical tasks. In this example or other examples, the original data may be preserved for maintaining context and comprehensive understanding of the scene. The mini-cube array contains information about the segment's content and intensity levels, which is valuable for accurate analysis and interpretation.

At reference block 44 the image frame horizon may be segmented and a mask may be created containing the sky and a number of pixels below the horizon equal to the perimeter offset which in one example is about 100-300 pixels and may be saved as the aforementioned mini-cube array in the two-band image. The mask is created from the long-range segment-utilizing mask ROI offset perimeters, which allow the number of pixels to mask from each side of the mini-cube array to be determined. According to one example, masking involves 10 pixels to each side of the mini-cube array, however other examples may utilize more or less pixels to accomplish the masking. As mentioned above, the two-band image resulting from combining the edge enhancement image from edge enhancement block 42 and the masked mini-cube array may be output through pre-processing output 46 to the detection block 28.

As a whole, the target detection block 28 may utilize pre-processed images from pre-processing block 26 and full image data 51 input into SRTD pipeline 52 to determine the presence of targets 20 in the images and image videos.

Figure 2B:
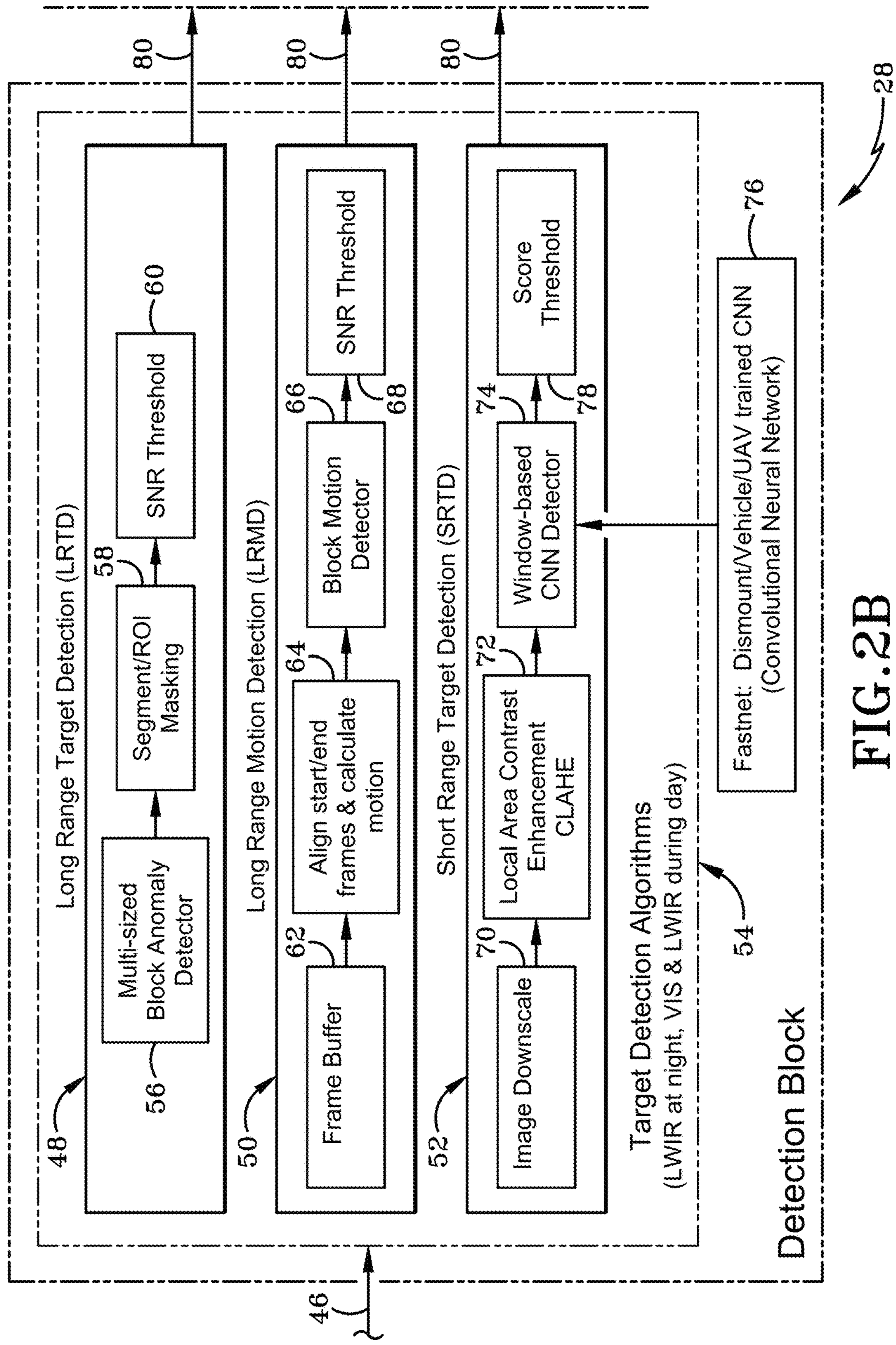
FIG. 2B (FIG. 2B) is a detection block of the CNN ATR from FIG. 2 according to one aspect of the present disclosure.

With reference to FIG. 2B, the exemplary detection block 28 will now be described in more detail starting with receiving pre-processing output 46, which may be routed through a long-range target detection (LRTD) pipeline 48 and a long-range motion detection (LRMD) pipeline 50. One exemplary operation with respect to LRTD pipeline 48 starts by taking the pre-processed image, which has been prepared for further analysis, potentially after applying techniques like edge enhancement, noise reduction, or other preprocessing steps discussed above. Then, extract relevant features from the pre-processed image. These features can include texture information, color histograms, shape descriptors, or any other features that are useful for detecting targets in the given context. Then, apply a target detection algorithm specific to long-range scenarios. This algorithm is designed to identify potential targets within the image based on the extracted features. Techniques like region-based CNNs, sliding window approaches, or other object detection algorithms may be utilized. Then, if necessary, classify the detected targets into different categories (e.g., vehicles, people, UAVs) based on the extracted features. Utilize a classification model trained for this purpose. Then, the LRTD pipeline 48 provides the detection results as an output, including the locations, bounding boxes, and categories of detected targets within the image.

In one specific example, LRTD pipeline 48 may locate small objects near the horizon utilizing a pixel-based method to find anomalous pixels as compared to local background pixels. To do so, a multi-sized block anomaly detector 56 algorithm may break a long-range pre-processed image segment into small blocks to calculate the local contrast signal to noise ratio of pixels against the median background of the blocks. A multi-sized block anomaly detector 56 algorithm is a technique used in LRTD to identify anomalies or targets in pre-processed image segments. This block anomaly detector 56 algorithm or technique involves breaking down the image into smaller blocks of varying sizes and analyzing the local contrast signal-to-noise ratio (SNR) of pixels against the median background of each block. One exemplary operation of block anomaly detector 56 begins with a pre-processed image segment obtained from the long-range video feed, which may have undergone preprocessing steps like noise reduction, edge enhancement, or other suitable operations. Then, divide the pre-processed image segment into multiple small blocks, each of a different size. This variation in block sizes allows for a flexible analysis, capturing anomalies at different scales. Then, for each block, calculate the local contrast for each pixel. Local contrast is typically computed by comparing the intensity of a pixel with respect to the median intensity of the surrounding pixels in the block. This helps identify regions with significant intensity differences. Then, compute the signal-to-noise ratio (SNR) for each pixel within the block. SNR is a measure of the strength of the signal (intensity of the pixel) relative to the noise in the background. It's usually calculated as the ratio of the local contrast to the standard deviation of the pixel values in the block. Then, determine the median intensity of the block, which represents the background intensity level for that block. Then, compare the SNR of each pixel against the median background intensity of the respective block. Pixels with higher SNR values compared to the median background are considered potential anomalies or targets. Then, apply a thresholding mechanism to determine whether a pixel is an anomaly based on its SNR value. Pixels exceeding a specified threshold are identified as anomalies. Then, this may optionally, generate an anomaly map highlighting the detected anomalies or targets within the image segment. This map indicates the locations where potential targets or anomalies are present.

With respect to block anomaly detector 56, typically, it is contemplated that two block sizes may be utilized. However, it will be understood that to ensure multiple sizes of targets are detected up to three block sizes can be run iteratively at the cost of increased processing time. The signal to noise ratio from each utilized block may be calculated using:

$$SNR=(T-Bmean)^{\wedge}2/Bvar$$

where T=target spectrum, Bmean=Background spectrum, Bvar=Background Variance.

The LRTD pipeline 48 is contemplated for use with LWIR imagery as thermal emissivity provides a better pixel discriminator as compared to color at long-ranges. Yet, it is to be understood that LRTD pipeline 48 can be utilized with other imagery different than LWIR as well. After running the block anomaly detector 56 the resulting array may be filtered utilizing a signal to noise ratio threshold and then dilated and eroded (default 2 pixels each) before moving on to the next processing stage.

One exemplary operation with respect to LRMD pipeline starts 50 with the pre-processed image for motion detection. Then, use techniques like frame differencing or optical flow to analyze changes between frames in a video sequence. Frame differencing calculates the pixel-wise differences between consecutive frames, highlighting regions with significant changes. Optical flow calculates the motion of pixels between frames. Then, apply a thresholding technique to convert the output of frame differencing or optical flow into a binary image, highlighting areas with motion. Use segmentation algorithms to group connected pixels into distinct motion regions. Then, classify the detected motion regions into relevant categories, such as stationary objects, slow-moving objects, or fast-moving objects. This classification can be based on the speed or intensity of the detected motion. Then, the LRMD pipeline 50 provides the motion detection results as an output, including the motion regions, their locations, and potentially their motion characteristics.

In one particular example, LRMD pipeline 50 may be utilized to detect moving objects at or near the horizon utilizing a frame buffer holding 10 frames of the long-range segments from pre-processing block 26. This frame buffer, shown at reference 62, may include 10 frames with the earliest frame being designated frame 1 and the last frame being designated as frame 2 for proper calculations. As new frames are added, they are included in the frame buffer 62 while dropping the earliest frames out of the frame buffer 62 (e.g., FIFO-first in first out) and re-designating the earliest and latest frames as frames 1 and 2 for continued calculation. The alignment of the frames and motion calculation is shown at reference block 64.

Then, once the frame buffer is populated and properly aligned, a block motion detector (BMD) 66 is employed. A block frame compensation algorithm may be applied by breaking the images into frame blocks. This may occur similar to the block anomaly detector 56 from LRTD pipeline 48, but with an overlap between each block. Each block is then utilized to create arrays designated as Frame 1 and Frame 2, which may be processed to orient/rotate via a function to find registration points between the arrays. The frame blocks may be warped with a geometric transform to register the images. A motion block mask is created for the warped images with zeros where frame 1_sm=0. The mask in one example is bloomed by 2 pixels to help it mask out edge artifacts, then the first pixel on each edge of the mask is set to zero.

In one example, the operation of BMD 66 enhances motion detection by compensating for frame differences in a sequence of images. This compensation involves breaking the images into overlapping frame blocks, creating arrays (frame 1 and frame 2) from each block, and aligning them to find registration points. This exemplary operation may divide the pre-processed images into overlapping blocks to enable compensation at a finer granularity. Overlapping blocks aid in achieving a more accurate alignment of frames. For each block, create two arrays: Frame 1 and Frame 2. Frame 1 represents the pixel values in the current block, and Frame 2 represents the corresponding block from a subsequent frame. Then, apply a registration function to align Frame 1 and Frame 2. This function calculates the necessary rotation, scaling, and translation to find the best match between the frames, essentially registering them. Then, utilize the registration function to calculate registration points that indicate the optimal alignment parameters for Frame 1 and Frame 2. These points help establish the transformation needed to align the frames accurately. Then, use a geometric transformation (e.g., affine transformation, homography) based on the registration points to warp Frame 2. The transformation is applied to align Frame 2 with Frame 1, compensating for any misalignment due to motion. Then, apply the geometric transformation to warp Frame 2, aligning it with Frame 1. This step ensures that the subsequent frame (Frame 2) is registered with the current frame (Frame 1) to account for motion between frames. Then, compute the frame difference between the original Frame 1 and the registered Frame 2. The compensated frame difference highlights the regions where motion has occurred, providing a more accurate representation of motion in the image sequence. The difference may be a difference block, diff_block is created from the warped frames (frame 2_sm-frame 1_sm), which is then normalized by subtracting the mean and setting all pixels less than zero to zero. The diff_block is run through the BMD 66, though the number of blocks used is low (1 to 4 per row and column). Typically, there is only one block used. The output array, ImFiltOut_motion, from the BMD 66 is filtered with a SNR threshold 68 for motion and masked with the motion block mask. Then, utilize the compensated frame difference to detect motion regions accurately.

In this example, each motion block is run through this process, adding the ImFiltOut_motion array from each block to a full-sized array, ImFiltOut_motion_full. This full array is dilated and eroded by one pixel to help make pixel clusters to have a sharper resolution. ImFiltOut_motion_full is sent to the next stage of processing.

The output array from the BMD 66 may be filtered with a signal to noise ratio threshold for motion, masked with SNR threshold 68, and masked with the motion block mask as discussed further herein. Masking with the SNR threshold is accomplished by determining the signal level and noise level for each element in the output array. The signal level could be the magnitude or intensity of the detected motion, while the noise level could be determined based on the noise characteristics of the sensor or system. Then, calculate the SNR for each element. Then, comparing the SNR of each element with the desired SNR threshold. If the SNR of an element is above the threshold, consider it as a valid signal and keep the corresponding value in the output array. If the SNR is below the threshold, consider it as noise and set the corresponding value in the output array to zero or another suitable value.

If the camera being utilized for long-range detection is a static camera, a simpler method of long-range motion detection may involve utilizing the full Frame 1 and Frame 2 and subtracting them and skipping the motion compensation and block analysis before running this full array through the block anomaly detectors 66.

One example may integrate the results from both pipelines 48, 50. One exemplary operation may combine the detection results from the LRTD pipeline 48 (targets and their categories) and the LRMD pipeline 50 (motion regions) to obtain a comprehensive understanding of the scene. This process may analyze the overlapping regions or correlations between detected targets and detected motion regions to gain insights into dynamic elements within the scene. Then, utilize this integrated information for higher-level applications such as situational awareness, object tracking, or decision-making in the given long-range scenario.

Additionally, detection block 28 in one example includes a short-range target detection (SRTD) pipeline 52 which may utilize full image data 51 from pre-processing output 46, however the image data may be downscaled as discussed further below. One exemplary operation with respect to SRTD pipeline 52 may be designed to detect targets in a short-range scenario. This exemplary operation may begin with the pre-processed image, which may have undergone operations such as resizing, noise reduction, color normalization, or other relevant preprocessing steps. The, extract relevant features from the pre-processed image that are indicative of potential targets. These features may include texture information, color histograms, shapes, or any other features useful for detecting targets in the given short-range context. Then, apply a target detection algorithm suitable for short-range scenarios. This algorithm is tailored to identify potential targets based on the extracted features. Techniques like region-based CNNs, sliding window approaches, or other object detection algorithms can be utilized. Then, if necessary, classify the detected targets into different categories (e.g., vehicles, people, objects) based on the extracted features. Employ a classification model trained for this purpose. The SRTD pipeline 52 may provide the detection results as output, including the locations, bounding boxes, and potentially the categories of the detected targets within the image. The resulting detection results provide valuable insights into the presence and location of targets in the short-range scenario, which can be utilized for various applications such as security monitoring, object tracking, or decision-making in real-time settings.

As mentioned above, the SRTD pipeline 52 is contemplated for detection of targets that are near the camera and take up a large portion of the image. "Near" the camera/sensor in one example is less than 150 meters. Thus, the SRTD pipeline 52 may utilize a window-based detector, such as detector 74, or another detector that compares sections of the images against a library of targets including vehicles and/or dismounts (i.e. people) with the output of the window-based detector for vehicles and/or dismounts being a list of region proposal boxes for potential targets 20. With respect to detector 74, one exemplary operation may include scanning the image with a sliding window, comparing the content within each window against the predefined target templates. The output of this window-based detector for vehicles and/or dismounts is a list of region proposal boxes that potentially contain targets. This may start with the pre-processed image, which has been prepared for target detection through preprocessing steps like noise reduction, scaling, and color normalization. Then, implement a sliding window technique to iteratively move a window of a predefined size across the image, systematically covering all sections of the image. Then, resize the content within each window to match the dimensions of the target templates (vehicles and/or dismounts) in the library. This resizing ensures consistency for comparison. For each window position and size, compare the content within the window against the target templates using techniques such as cross-correlation or a similarity metric. The comparison helps assess the similarity between the content in the window and the target templates. Then, apply a similarity threshold to determine whether the content within the window matches a target template. If the similarity score exceeds the threshold, consider the window as a potential region of interest for a specific target class (e.g., vehicle or dismount). Then, create region proposal boxes around the windows that exceed the similarity threshold. These proposal boxes serve as potential bounding boxes for targets (vehicles and/or dismounts) detected within the image. Then, accumulate the region proposal boxes generated for each potential target (vehicle and/or dismount) into a list. Each region proposal box represents a potential target location in the image. Then, provide the list of region proposal boxes for vehicles and/or dismounts as the output of the window-based detector. Each proposal box contains information about the location and dimensions of a potential target.

As mentioned above the SRTD pipeline 52 may utilize full images (represented by arrow 51) and image data thereof. In addition to the technique discussed above, the image frame may be first downscaled at block 70 using nearest neighbor interpolation that in one example is 40% of its original size to improve processes and reduce memory usage. While a scaling of 40% is used in the example, other scaling percentages are used depending upon the full image size. This image downscaling 70 reduces the frame. In one example the image is reduced to 480 rows and 768 columns when utilizing a 1200×1920 resolution camera. One exemplary operation of the downscaling at block 70 may include start with the original full-size image that needs downscaled. Then, calculate the new dimensions (width and height) for the downscaled image, which may be 40% of the original size in this example. To downscale using nearest neighbor interpolation, apply nearest neighbor interpolation to downscale the image to the new dimensions. For each pixel in the downscaled image, find the corresponding pixel in the original image using the inverse of the scaling factor. Assign the value of the nearest neighbor pixel (rounded coordinates) from the original image to the corresponding pixel in the downscaled image.

The downsized image may then be changed into bit integer such as an 8 bit signed integer and run through contrast limited adaptive histogram equalization (CLAHE) to improve contrast across the whole image. The CLAHE enhancement, shown at reference block 72, adjusts contrast in each of the tiles, similar to how a block anomaly detector operates on a block of the image. This controls the distribution of the histogram by clipping the top of the curve to produce more contrast. One exemplary operation of this may include starting with the downsized image obtained in the previous step, which is 40% (in this example, but other percentages are possible) of the original size. Then, converting the image to an 8-bit representation. Since it's a grayscale image, the pixel values will range from 0 to 255 for an 8-bit image. For an 8-bit signed integer representation, the range is typically from −128 to 127. Then, map the original pixel values to the 8-bit signed integer range, ensuring the range covers the full dynamic range of the original image. Then, apply the CLAHE to the 8-bit signed integer image. CLAHE is a technique that enhances the contrast of the image while limiting the amplification of noise. Then: (1) divide the image into smaller, non-overlapping blocks; (2) compute the histogram of each block; (3) apply histogram equalization to each block, considering a local histogram to enhance contrast; and (4) clip the histogram to a predefined maximum value to prevent excessive amplification of noise (contrast limitation). Once the CLAHE is applied, obtain the final image with improved contrast across the entire image after applying CLAHE to the 8-bit signed integer representation.

Once the image has been downscaled and enhanced utilizing CLAHE, a set of image windows from the frame can be run in a batch through a CNN 74. This CNN may be trained, as described above, to detect and identify vehicles, dismounts, UAVs, or any other desired targets 20 according to the specific and desired implementation of ATR system 10. In one general operation, this may be accomplished by dividing the enhanced image into overlapping or non-overlapping image windows. Each window may be a smaller portion of the enhanced image and will be input into the CNN for target detection and identification. Then, collecting these image windows and process them in batches to optimize computation. Batching allows for parallel processing and efficient utilization of computing resources. Then, preparing each image window to be compatible with the input requirements of the CNN. Resize the image windows to match the input dimensions expected by the CNN (e.g., width, height, channels), if necessary. Then, passing the preprocessed image windows through the trained CNN using a feedforward pass. The CNN processes each window and generates predictions regarding the presence and type of target (e.g., vehicle, dismount, UAV) within each window. Then, analyzing the CNN predictions to detect and classify targets within each image window. The CNN's output will provide confidence scores or probabilities for different classes, indicating the likelihood of each window containing a specific type of target. Then, applying thresholding or other post-processing techniques to refine the CNN predictions. This step can involve filtering out predictions below a certain confidence threshold, removing duplicate detections, or incorporating additional information to improve the accuracy of target detection and classification. Obtain the final detection and classification results for each image window, including the presence or absence of targets (vehicles, dismounts, UAVs) and their respective classifications based on the trained CNN.

In one particular example, this window based CNN detector 74 may utilize a series of square windows with a starting bottom row and a height and width that is moved from left to right by a predetermined number of pixels (referred to as a stride) to capture a snapshot of all of the pixels in the window. The window, as used herein, is an ROI in the algorithm. Each image frame may include different window sizes with larger windows towards the bottom of the image frame and reducing in size as the frames approach the horizon of the image. This is done in part to filter targets based on range. Thus, the starting position for each ROI is in the perimeter as a large vertical height perimeter and includes the bottom row of the window. While contemplated for use with square shaped windows ATR system 10 may utilize rectangular ROIs as desired.

With continued reference to this example, the starting row position is adjusted automatically based on the horizon line location, which is adjusted by the camera pitch. In this example, at pitch 0, the horizon is assumed to be at row 240 of the downscaled image. The horizon offset is equal to the base horizon minus the current horizon for the frame, and this result may be considered as the downscale factor. For example, if the frame horizon is at pixel 500, the downscaled horizon is 200, so the offset is 240–200=40. This offset is subtracted from the Large_Vertical_Height array so that all the ROI boxes start higher up in the image. If the offset makes any value in Large_Vertical_Height greater than the maximum row (480 in this example), the array value is set to 480. To account for targets at the edge of the frame there are edge ROIs made by padding the image and filling the sides such as with the color black. The amount of padding is determined by the maximum patch size (e.g.: 300) and the pad scale factor (0.25 in this example). This is rounded down using the "floor" method.

$$\text{pad\_val} = \text{floor}(\text{Patch\_width\_max} * \text{padscalefactor})$$

The ROI boxes start at the padded column, and are iteratively shifted to the right by the StrideMax (Default: 50 pixels), scaled by the patch width, with an additional Stride offset.

$$\text{Stride} = \text{floor}\left(\textit{Stride}\text{Max} \cdot^{*} (\text{patch\_width}/480)\right) + \text{Stride\_offset}$$

The windows should be the same size for the CNN to operate, so each ROI is scaled, such as to 64×64 pixels, and saved within a 4-D array. The maximum number of ROIs in the array in one example is 2000. The default settings have 1554 ROIs (64×64×1×1554 for the 4-D array).

The CNN 76 utilized herein is dubbed "fastnet" and is contemplated as a custom CNN built to run certain sized LWIR images such as 64×64 LWIR images and to classify vehicles, dismounts and UAVs. Again, the CNN 76 is flexible and may be expanded to include other target types and subtypes as desired. CNN 76 may be trained utilizing images downscaled such as to 64×64 and further utilizing image augmentation with upscaling up to about 1.25 and pixel offset of −5 to +5.

In one particular example, training data is made up of grayscale images such as 8-bit images at 227×227 resolution. These images can be used for high-resolution networks, such as Squeezenet or others. There may be as many classes in the training set as needed or expended to be found in live operation. Examples of such classes may include normal, dark, and partial dismounts, and normal and dark vehicles. Combining some classes, such as normal with normal and dark with dark/partial may provide an added learning benefit to the CNN as intensity is a primary class feature used by the CNN.

Once fully trained, CNN 76 may be applied to window based CNN detector 74, as discussed above, to generate a CNN scoring or score threshold shown at block 78. To do so, the 4D array of ROIs may be run through the CNN 76 in a batch process. This is dependent on the GPU being able to process in batches, as otherwise the CNN is called each time per image. The function is called:

$$(\text{LWIR\_class}, \text{score}) = \text{classify}(\text{Fastnet\_LWIR}, 4\text{−D\_array})$$

For the SRTD pipeline 52 the goal is to detect vehicles and possible dismounts while allowing LRTD 48 and LRMD 50 to handle the detection of UAVs. Therefore, for the window based CNN detector 74 target subclasses may be combined to just those four vehicles and possible dismounts. Detections are then determined as the ROIs with combined scores passing the detection thresholds 78 which are then compared using a non-maximal suppression routine to filter out overlapping ROIs with lower scores. Dismounts may be the sum of the scores of classes 1, 2, 3, while vehicles may be the sum of scores for classes 5 and 6. The code is shown below:

$$\text{combo\_score\_ped} = \text{sum}(\text{score}(:, 1{:}3), 2);$$

$$\text{combo\_score\_veh} = \text{sum}(\text{score}(:, 5{:}6), 2)$$

Detections are determined as the ROIs with combined scores that pass detection thresholds:

$$(\textit{pedmatch}) = \text{find}(\text{combo\_score\_ped} >= \text{minscore\_ped\_lg});$$

$$(\textit{vehmatch}) = \text{find}(\text{combo\_score\_veh} >= \text{minscore\_veh\_lg});$$

The detection ROIs are then compared using a non-maximal suppression (NMS) routine to filter out overlapping ROIs with lower scores. ROI box overlap area for dismounts is made narrower using the widthShrink parameter (Default 0.4) and overlap area for vehicles are made flatter with the heightShrink parameter (Default 0.75). These region proposals go on to the detection processing stage with another CNN chip classification routine to finalize the detection.

Figure 2C:
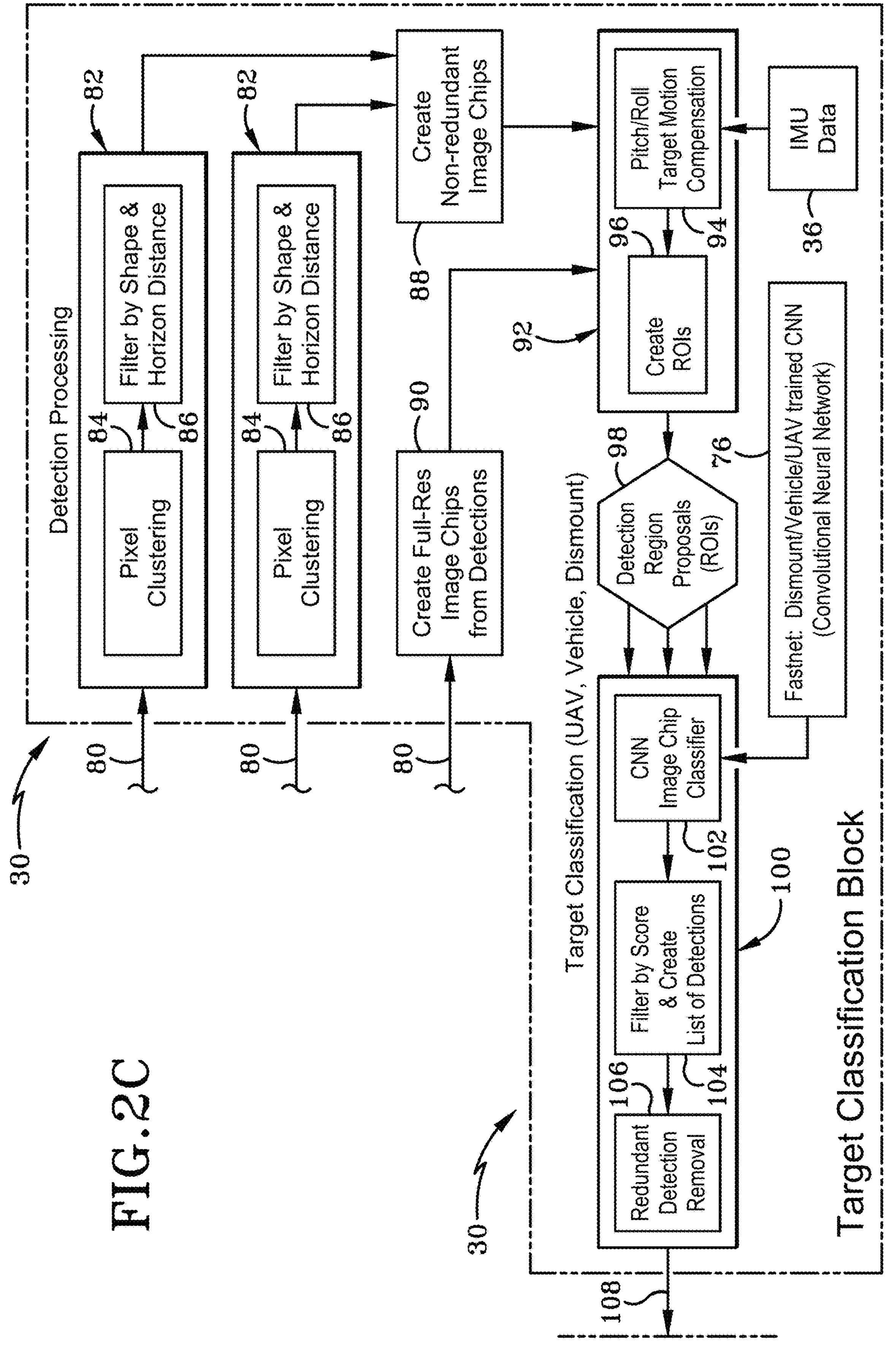
FIG. 2C (FIG. 2C) is the targeted classification block of the CNN ATR from FIG. 2 according to one aspect of the present disclosure.

Each of the outputs of LRTD pipeline 48, LRMD pipeline 50 and SRTD pipeline 52 may then be sent to outputs 80 of detection block 28 and to the target classification block 30 as shown in FIG. 2C.

With reference then to FIG. 2C, target classification block 30 will now be discussed in more detail. Specifically, this stage takes the output 80 from all of the detection pipeline, namely the LRTD pipeline 48, the LRMD pipeline 50 and the SRTD pipeline 52 and prepares image chips and pixel clusters before classifying the targets 20 into the proper classification. Image chips are small rectangular or square patches extracted from the input images. These patches are regions of interest that potentially contain targets (e.g., vehicles, dismounts, UAVs) detected by the respective pipelines. For ROI Extraction, utilize the outputs from the LRTD, LRMD, and SRTD pipelines to identify ROIs within the image. These ROIs represent potential targets detected by the pipelines. For image chip extraction, extract image chips centered around the detected ROIs. The image chips are usually of a standardized size and contain the potential targets for further analysis and classification. Regarding pixel clusters preparation, define pixel clusters as groups of neighboring pixels that are relevant for classification. These clusters capture local patterns and features within the image. Then, segment the image into smaller regions or clusters of pixels. This segmentation can be achieved through techniques like k-means clustering, watershed segmentation, or any other suitable method. Then, extract relevant features from each pixel cluster. These features may include color histograms, texture information, pixel intensity statistics, or other descriptors that capture the characteristics of the cluster. Regarding feature aggregation, combine image chips and pixel clusters to create a comprehensive set of features for each potential target. Then, combine features extracted from image chips and pixel clusters using appropriate fusion techniques. This fusion enhances the representation of the target, incorporating both local and global features. Regarding target classification, utilize the aggregated features (from image chips and pixel clusters) as input to classification models. These models can include machine learning algorithms like the CNN or another CNN, Support Vector Machines (SVM), Random Forests, or other classifiers. Then, use the trained classification models to classify the potential targets into the appropriate classes (e.g., vehicle, dismount, UAV) based on the extracted features and patterns. Then, provide the final classification results, including class labels (e.g., "vehicle", "dismount", "UAV") and confidence scores indicating the model's confidence in the assigned class for each target.

In one particular example, the output 80 from both LRTD and LRMD pipelines 48, 50 include pixel array filter maps that feed into the detection processing sub-blocks 82 while the SRTD pipeline 52 feeds ROI boxes into full resolution image chips from the detections shown at block 90. In particular, both the LRTD and LRMD pipelines 48 and 50 feed the pixel array filter maps into the detection processing sub-block 82 where the filter maps are clustered using 2D connected components with eight pixels of connection. Specifically, the Filter Map from the Small Target Detector is clustered using a 2-D connected components algorithm with eight pixels of connection. Clusters are filtered by pixel area and general shape, removing spurious clutter objects to make a list of region proposals and draw boxes around them for analysis. Cluster statistics are determined by fitting a data ellipse to the pixel distribution within $C_N$. The size and shape parameters are derived from the major and minor axes of the ellipse. We assume that detection pixels of an underlying hard target are distributed according to a rectangular distribution function. The variance $\sigma^2$ and length L of a rectangular distribution are related by:

$$\sigma^2 = \frac{1}{12}L^2$$

The length and width of the hypothesized target object producing the detected cluster $C_N$ can be determined from the variance of the distribution of pixels within the cluster. We can define a (2×2) spatial covariance matrix associated with the cluster $C_N$ as:

$$\sum(C_N) = \begin{pmatrix} \sigma^2_{row(j)} & \sigma^2_{ij} \\ \sigma^2_{ij} & \sigma^2_{column(i)} \end{pmatrix}$$

Where $$\sigma^2_{row(j)} \text{ and } \sigma^2_{row(j)}$$

are the variance of the row and column indices in the cluster respectively and $$\sigma^2_{ij}$$

is the row-column covariance. Defining $\lambda_1$ and $\lambda_2$ as the eigenvalues of $\Sigma(C_N)$ with $\lambda_1>\lambda_2$ the major and minor axis statistics of the cluster are:

$$\text{major\_axis} = \sqrt{12\lambda_1}$$

$$\text{minor\_axis} = \sqrt{12\lambda_2}$$

Two additional statistics are computed from the above results: axis ratio and area ratio. The axis ratio is given by:

$$\text{axis\_ratio} = \frac{\text{major\_axis}}{\text{minor\_axis}}$$

Additionally, the detection centroid (center pixel in the cluster) is given by:

$$\text{centroid column} = \langle C_N \rangle_i$$

$$\text{centroid row} = \langle C_N \rangle_j$$

Once pixel clustering is performed, the clusters may then be filtered area and access ratio, which are scaled by the distance from the horizon. This is shown as filtering by shape and horizon distance at block 86. The bottom of the cluster is the highest row value of the cluster.

$$\text{horizon\_distance} = ((y0 - y1)^*x + (x1 - x0)^*y + (x0^*y1 - x1^*y0))/(((x1 - x0)^\wedge 2 + (y1 - y0)^\wedge 2)^\wedge 0.5)$$

where ×0 and y0 are the starting point of the horizon, ×1 and y1 are the end point of the horizon while x and y are the target centroid. This equation is designed to also work for a rotated horizon to account for changes in camera roll.

The relationship between distance below the horizon and range may be calculated using the Range-Slope linear function parameter. It gives a way to estimate expected area in meters for targets based on the number of pixels below the horizon. The default values for Range-Slope=[0.125 0]. Normally, this value is calculated using a Range-Slope algorithm when there is a clear and visible horizon line, on the ocean, for example. For cameras mounted on a vehicle, the horizon is often obscured, so a simpler estimate is:

$$\text{pixels\_per\_m} = (\text{range\_slope}(1)^{*}\text{horizon\_distance}) + \text{range\_slope}(2)$$

The value of pixels_per_m is used to filter out detections that much larger or smaller than expected based on their position relative to the horizon. It does not apply to UAVs above the horizon, in the air, only on vehicles and dismounts, although modifications could be made for such applications. The area threshold is scaled by the typical rectangular axis ratio of targets (0.33 for vehicles and dismounts).

$$\text{min}size = \text{minimum target length in meters}^{*}\text{pixels\_per\_m};$$

$$\text{max}size = \text{maximum target length in meters}^{*}\text{pixels\_per\_m};$$

$$\text{min}area = \text{min}size\text{^}2 * \text{rectangular target axis ratio}$$

$$\text{max}area = \text{min}size\text{^}2 * \text{rectangular target axis ratio}$$

The long-range detection list from LRTD pipeline 48 and the long-range motion detection list from LRMD pipeline 50 may be combined using a non-maximal suppression routine to filter out redundant detections with smaller area overlapping detections with centroids greater than the distance threshold are retained. Once combined each pixel cluster from the LRTD and LRMD pipelines 48 and 50 may be utilized to created non-redundant image chips, which may be a ROI box within the full resolution image. This stage utilizes the original full resolution images for both long-range and short-range detections with the centroid of the modified ROI being used to make a new square image chip for the short-range detector. These long-range and short-range ROIs may again overlap and in such cases may be run through another non-maximal suppression routine to filter out detections with the lower score thresholds. These non-maximal suppression routines may be done per each class type, so only overlaps among each class type will be removed. For example, overlapping dismounts with other dismounts are removed as with overlapping vehicles with other vehicles. The goal is to allow different target 20 types to overlap such as target persons 24 overlapping with target vehicles 22.

Small overlapping ROIs may be kept depending on the percentage threshold of overlap as well as the distance between their centroids and the large ROI centroid. In other words, if some pixels overlap but the centroids are separated by sufficient distance these may be kept and counted as two close but separate distinct targets. For example, two separate distinct targets could be two people standing next to each other or two vehicles traveling close together.

With continued reference to FIG. 2C, the full resolution image chips 90 and non-redundant images chips 88 may be fed into a classification sub-block 92 or they may be further processed to rotate the image chips so that they have a horizontal horizon. This is done in the pitch and roll target motion compensation block 94 utilizing IMU data 36 to identify any frames that may have been rotated due to image chips being taken from video on a moving platform (i.e. vehicle 18). In one example, for any rotated frames, the center 70% of the image may be cropped out and rotated. However, other examples may utilize a different percentage of the image to be cropped out and rotated. This may allow the chip to avoid having black corners and pitch data may be saved within the detection metadata so that it may be used in tracking to normalize position as needed.

Once the full resolution and non-redundant image chips 90 and 98 are pitch and roll compensated 94, the ROI chips may be scaled to, in one example, 64×64 using nearest neighboring interpolation then saved into 8 bit. The ROI chips are all stretched using a standard deviation method to enhance contrast resulting in a list of ROI detection region proposals with metadata and image chips. The creation of 8 bit 64×64 ROIs is shown at block 96 while the final list result of ROI detection regions is shown at reference block 98.

The ROI detection region proposal list 98 may then be classified using the CNN image chip classifier 102 in classification sub-block 100 wherein the CNN 76 may be applied to analyze the image sections to filter out clutter that would normally pass through other shape analysis steps.

The final detection ROI corners are measured using a "heatmap" approach. This involves using the Rectified Linear Unit (ReLU) output of the Fastnet or other processing algorithm in the third layer. This is called the relu_3 layer and in C++ it can be extracted during the CNN batch call. It requires a separate function call on the 4D Array of ROI chips.

*imageActivations* = activations(Fastnet_LWIR, box_LWIR_resize_fastnet_4*D*, 'relu_3');

The heatmap is made by summing all of the activation layers. It is then resized, in one example, to 64×64 and masked for dismounts of vehicles using the heightshrink or widthshrink parameters. The extents of the highest value pixels determines the "refined" ROI extents. The threshold for the highest value in rows and columns vectors is calculated iteratively based on the mean of the heatmap pixels and a range of scale factors (default 0.9 0.8 0.7). The refined ROI is adjusted for dismounts if the ratio of width to height is less than the min row/col axis threshold (2.5). Height is automatically scaled to this ratio if it is not otherwise.

Classified chips with refined ROI boxes that pass the score threshold are run through a final non-maximal suppression routine to create a Frame Detection List for each target type. These lists are sent to the motion-analysis and tracking routine.

Once the classified filtering and redundant detection removal 102, 104, and 106 steps are completed in classification sub-block 100, a frame detection list (shown as 110 in FIG. 2D) may be generated and output to the motion block 32 via output 108.

Figure 2D:
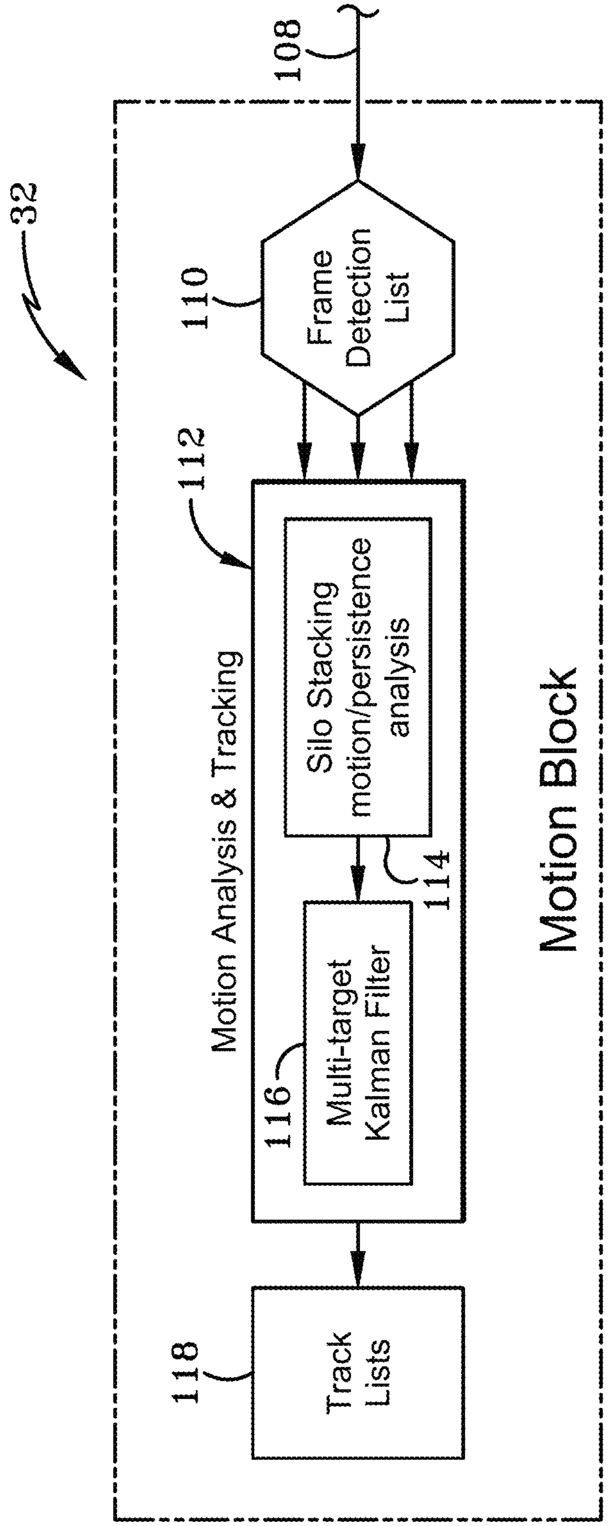
FIG. 2D (FIG. 2D) is the motion block of the CNN ATR from FIG. 2 according to one aspect of the present disclosure.

With reference to FIG. 2D, the motion block 32 will now be described in more detail. Specifically, as mentioned above, the frame detection list 110 may be delivered to motion block via output 108 where it may enter the motion analysis and tracking sub-block 112. These frame detection list 110 may be specific to a particular target type (i.e. vehicle, dismount, UAV) and may be fed, in one example, continuously into the motion analysis and tracking sub-block 112 to generate final track list including metadata. These track list are shown at reference 118. While frame detection list 110 moves through the motion analysis and tracking sub-block 112, the list may be inserted into a silo stacker, which may be a silo stacking motion persistence analysis 114. The silo stacker combines detections from multiple frame detection list 110 by grouping them together based on azimuth and elevation and corrected for motion. The clusters of detection may then be used to calculated persistence (detections per-opportunity), shape consistency (variates area and access ratio), as well as metadata such as range, position, and shape.

In one example, the persistence and shape consistency could refer to the following. Persistence can refer to the ability of an object to persistently appear in consecutive frames over time. It is a measure of how consistently an object is detected across multiple frames. Persistence is often calculated as the ratio of the number of frames in which an object is detected to the total number of frames analyzed. Mathematically, persistence can be expressed as follows:

Persistence = Number of Frames with Detection/Total Number of Frames

For example, if a vehicle is detected in 8 out of 10 consecutive frames, the persistence would be $8/10$=0.8 or 80%.

Shape consistency refers to how stable the shape of an object remains over time. It involves analyzing the variations in the object's area and aspect ratio across frames. The calculation beings with the variation in area, which is the relative change in the object's area can be calculated using the formula:

Area Variation = (Max Area − Min Area)/Average Area where Max Area is the maximum area, where Min Area is the minimum area, and Average Area is the average area of the object across frames.

The calculation then continues with the aspect ratio, wherein the aspect ratio is the ratio of the object's width to its height. The aspect ratio consistency can be calculated as:

Aspect Ratio Consistency = (Max Aspect Ratio − Min Aspect Ratio)/Average Aspect Ratio where Max Aspect Ratio is the maximum aspect ratio, Min Aspect Ratio is the minimum aspect ratio, and Average Aspect Ratio is the average aspect ratio of the object across frames.

By way of example, if a vehicle's area varies from 1000 pixels to 1200 pixels, and the aspect ratio varies from 1.5 to 1.8 over five frames, the area variation might be (1200-1000)/1100=0.1818 or 18.18%, and the aspect ratio consistency might be (1.8-1.5)/1.65≈0.1818 or 18.18%.

In one example, the multi-target Kalman filter may only applied to detected targets in the frame detection lists that pass a predetermined threshold for persistence and shape consistency. For example, the threshold for persistence can be set to 80% or some other percentage depending on applications specific needs. (e.g., it could be 85%, 90%, 95%, or 99.7%). The threshold for shape consistency could be set to about 20% or some other percentage depending on application specific needs (e.g., it could be 1%, 10%, 30%, 40%, 50%, 60% or 70% or more).

Figure 3:
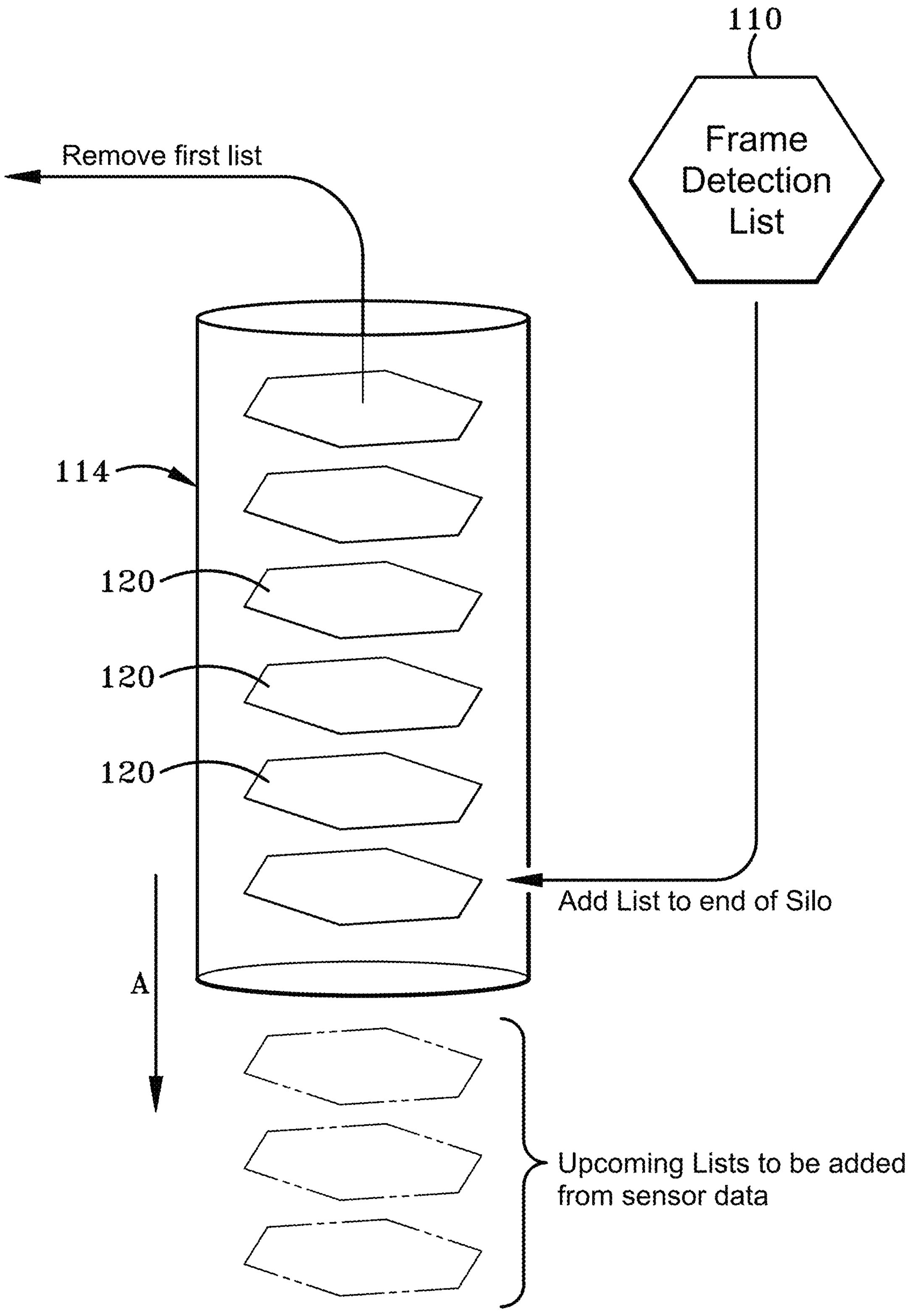
FIG. 3 (FIG. 3) is an operational view of a frame buffer analysis of the CNN ATR system according to one aspect of the present disclosure.

The number of frames added to the silo stacker depends on the maximum latency requirement for the target types and the speed of motion of the target but generally ends up being approximately five frames. As discussed further below, with reference to FIG. 3, these frame detection list may be added at the end of the silo as they are delivered into the motion analysis and tracking sub-block 112. While the oldest detection list in the silo stacker may be removed and discarded. Specifically, as best seen in FIG. 3, as the oldest or first list is discarded and a new frame detection list 110 is added the silo stacking analyzer 114 may move through the detection list 120 in the direction of arrow A indicated in FIG. 3. This ensures that upcoming list from the sensor data get added to the front end while older list get removed first as depicted therein.

The contacts that pass all of the threshold measurements may then be moved onto the tracking analyzer, which may be a multi-target Kalman filter shown at reference 116. This tracker is designed around the multi-target Kalman filter to allow simultaneous tracking of multiple targets within a normalized azimuth and altitude space while accounting for pitch and roll offsets. Each of these silo stacking motion analysis and Kalman filter analyzers 114 and 116 may be dedicated to different target types so that there are different tracking pipelines for target vehicles 22 and/or target persons 24 (or other target types such as UAVs) to ensure that these target types do not get confused or otherwise misidentified.

Figure 4:
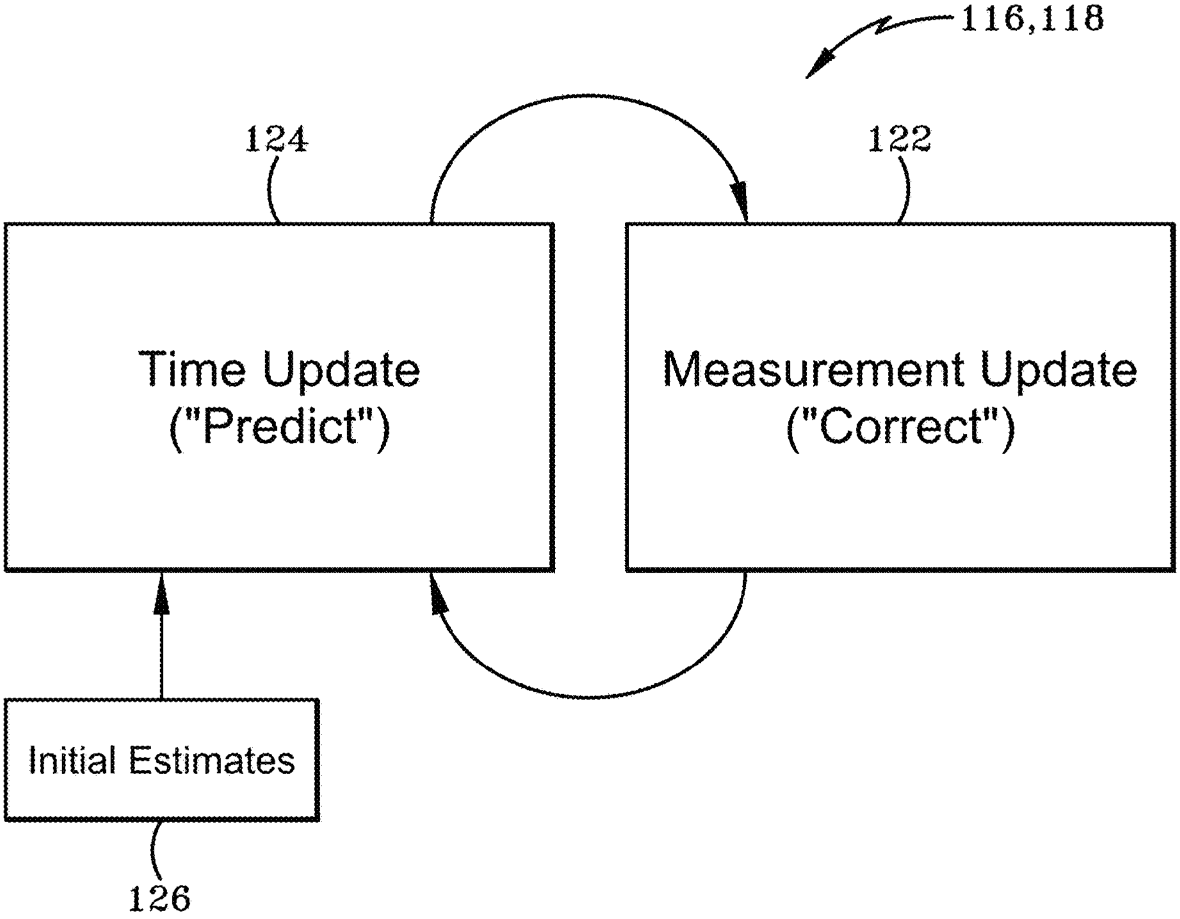
FIG. 4 (FIG. 4) is an operational view of a multi-target Kalman filter feedback loop of a CNN ATR system according to one aspect of the present disclosure.

With continued reference to FIG. 2D and with reference to FIG. 4, the multi-target Kalman filter 116 may utilize the Hungarian method costs matrix, where new detections are compared to existing tracks to find the lowest "costs" a value that account for Euclidean distance and pixel area differences. Unassigned tracks may continue with the same states until they reach the threshold for invisibility and are then deleted. Put another way, these targets will continue to be tracked until they are no longer detectable, at which point they are deleted. As seen in FIG. 4 the multi-target Kalman filter 116 and track list 118 may be utilized with measurement updates 122 and time updates 124 as compared by the initial estimates 126 in a circular feedback loop as shown in FIG. 4. The equations for the Kalman filters are:

Time Update ("Predict")

(1) Project the state ahead $$\hat{x}_k^- = A\hat{x}_{k-1} + Bu_k$$

(2) Project the error covariance ahead $$P_{\tilde{k}} = AP_{k-1}\,A^T + Q$$

Measurement Update ("Correct")

(1) Compute the Kalman gain $$K_k = P_{\hat{k}}H^T\left(HP_{\hat{k}}H^T + R\right)^{-1}$$

-continued (2) Update estimate with measurement $z_k$ $$\hat{x}_k = \hat{x}_k^- + K_k(z_k - H\hat{x}_k^-)$$

(3) Update the error covariance $$P_k - (I - K_k H)P_k^-$$

and the initial estimates for $\hat{x}_{k-1}$ and $P_{k-1}$.

Having described the process and algorithms utilized for ATR system 10 the generalized use thereof will now be discussed further. Specifically, the use of CNN 76 allows for real-time processing of both daytime visual and LWIR video and/or images for target detection, identification, classification and tracking. While further using LWIR video at night the use of both types of detectors allow for a window based near field detector to be combined with a long-range infrared detector to detect, identify and track targets at a real-time or near real-time speed even from a moving vehicle including aircraft and or maritime vehicles.

The combination of pixel based long-range detectors and window based short-range detectors is increasingly important for military operations where situational awareness is critical but may be adapted for non-military applications as automated driving and/or security needs evolve. Other such applications may likewise benefit from the implementation of ATR system 10 and/or similar ATR systems utilizing a fast convolutional neural-network which may be trained and or retrained for ever-evolving targets and threats.

At its most basic, as discussed herein, ATR system 10 may simply utilize the features of LWIR and visual RGB detectors, or other sensors, along with machine trained CNN to compare and process single frames and groups of images from video detection to identify, classify, and track targets. ATR system 10 may do so utilizing heat maps approach involving use of rectify linear unit output as a third layer of the CNN, allowing for more accurate and real-time results.

The system of the present disclosure may additionally include one or more sensors to sense or gather data pertaining to the surrounding environment or operation of the system. Some exemplary sensors capable of being electronically coupled with the system of the present disclosure (either directly connected to the system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The system of the present disclosure may include wireless communication logic coupled to sensors on the system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the system of the present disclosure, the system may use a variety of protocols (e.g., Wi-Fi®, ZigBee®, MIWI, BLUETOOTH®) for communication. In one example, each of the devices, assemblies, or systems of the present disclosure may have its own IP address and may communicate directly with a router or gateway. This would typically be the case if the communication protocol is Wi-Fi®. (Wi-Fi® is a registered trademark of Wi-Fi Alliance of Austin, TX, USA; ZigBee® is a registered trademark of ZigBee Alliance of Davis, CA, USA; and BLUETOOTH® is a registered trademark of Bluetooth Sig, Inc. of Kirkland, WA, USA).

In another example, a point-to-point communication protocol like MiWi or ZigBee® is used. One or more of the system of the present disclosure may serve as a repeater, or the systems of the present disclosure may be connected together in a mesh network to relay signals from one system to the next. However, the individual system in this scheme typically would not have IP addresses of their own. Instead, one or more of the systems of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. As such, one aspect or embodiment of the present disclosure may be a computer program product including least one non-transitory computer readable storage medium in operative communication with a processor, the storage medium having instructions stored thereon that, when executed by the processor, implement a method or process described herein, wherein the instructions comprise the steps to perform the method(s) or process(es) detailed herein.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of components A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur. In one example, a target is detected in the ROI of a video that is provided by a supplier of the sensor. This supplier would be the entity that is "effecting" the user of the system to perform the functions, actions, or steps detailed herein. Thus, a method could be accomplished by the supplier of the technology that effects a customer to capture, via at least one detector, a sequence of image frames that define a video depicting the ROI; effects the customer to process the video with at least one of a long range target detection (LRTD) pipeline, a long range motion detection (LRMD) pipeline, and a short range target detection (SRTD) pipeline to detect the at least one target in the video in or near the ROI; effects the customer to apply a convolutional neural network (CNN) to the video to identify and classify the at least one target therein; effects the customer to generate at least one frame detection list containing data about the at least one target; effects the customer to calculate persistence and shape consistency of the at least one target; and effects the customer to apply at least one multi-target Kalman filter to the at least one frame detection list to generate a track list including the at least one target, wherein the at least one target is tracked in response to detection in the video of the ROI, and effecting the at least one target to be tracked.

When a feature or element is herein referred to as being “on” another feature or element, it can be directly on the other feature or element or intervening features and/or elements may also be present. In contrast, when a feature or element is referred to as being “directly on” another feature or element, there are no intervening features or elements present. It will also be understood that, when a feature or element is referred to as being “connected”, “attached” or “coupled” to another feature or element, it can be directly connected, attached or coupled to the other feature or element or intervening features or elements may be present. In contrast, when a feature or element is referred to as being “directly connected”, “directly attached” or “directly coupled” to another feature or element, there are no intervening features or elements present. Although described or shown with respect to one embodiment, the features and elements so described or shown can apply to other embodiments. It will also be appreciated by those of skill in the art that references to a structure or feature that is disposed “adjacent” another feature may have portions that overlap or underlie the adjacent feature.

Spatially relative terms, such as “under”, “below”, “lower”, “over”, “upper”, “above”, “behind”, “in front of”, and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly. Similarly, the terms “upwardly”, “downwardly”, “vertical”, “horizontal”, “lateral”, “transverse”, “longitudinal”, and the like are used herein for the purpose of explanation only unless specifically indicated otherwise.

Although the terms “first” and “second” may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to “an embodiment,” “one embodiment,” “some embodiments,” “one particular embodiment,” “an exemplary embodiment,” or “other embodiments,” or the like, means that a particular feature, structure, or characteristic described in connection with the embodiments is included in at least some embodiments, but not necessarily all embodiments, of the invention. The various appearances “an embodiment,” “one embodiment,” “some embodiments,” “one particular embodiment,” “an exemplary embodiment,” or “other embodiments,” or the like, are not necessarily all referring to the same embodiments.

If this specification states a component, feature, structure, or characteristic “may”, “might”, or “could” be included, that particular component, feature, structure, or characteristic is not required to be included. If the specification or claim refers to “a” or “an” element, that does not mean there is only one of the element. If the specification or claims refer to “an additional” element, that does not preclude there being more than one of the additional element.

As used herein in the specification and claims, including as used in the examples and unless otherwise expressly specified, all numbers may be read as if prefaced by the word “about” or “approximately,” even if the term does not expressly appear. The phrase “about” or “approximately” may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as “comprising,” “including,” “carrying,” “having,” “containing,” “involving,” “holding,” “composed of,” and the like are to be understood to be open-ended, i.e., to mean including but not limited to. Only the transitional phrases “consisting of” and “consisting essentially of” shall be closed or semi-closed transitional phrases, respectively, as set forth in the United States Patent Office Manual of Patent Examining Procedures.

To the extent that the present disclosure has utilized the term “invention” in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A computer program product including one or more non-transitory machine-readable mediums encoded with instructions that when executed by one or more processors cause a process to be carried out for automated target recognition and tracking, the process comprising:

capturing, via at least one detector, a sequence of image frames that define a video depicting a region of interest (ROI);

processing the video with at least one of a long range target detection (LRTD) pipeline, a long range motion detection (LRMD) pipeline, and a short range target detection (SRTD) pipeline operating on image frames of the captured video to detect the at least one target in the video in or near the ROI, the processing including computing a horizon line using an inertial measurement unit (IMU) horizon detection filter and applying a horizon-based mask containing sky and a number of pixels below the horizon equal to a perimeter offset, and, for LRMD, using a frame buffer holding 10 frames and performing block-based registration and motion compensation by warping frame blocks with a geometric transform to register the images prior to motion detection;

applying a convolutional neural network (CNN) to the video to identify and classify the at least one target therein;

generating at least one frame detection list containing data about the at least one target;

calculating persistence and shape consistency of the at least one target, wherein persistence is detections-per-opportunity across consecutive frame detection lists, and shape consistency is variations in area and aspect ratio across frames;

applying at least one multi-target Kalman filter, only to detections that satisfy predetermined thresholds for persistence and shape consistency, to the at least one frame detection list to generate a track list including the at least one target, wherein the at least one target is tracked in response to detection in the video of the ROI, and effecting the at least one target to be tracked.

2. The computer program product of claim 1, the process further comprising:

processing image frames through the LRTD pipeline and the LRMD pipeline; and generating a frame array from each of the LRTD and LRMD pipelines.

3. The computer program product of claim 1, the process further comprising:

processing raw image frames from the video through the SRTD pipeline;

generating a set of image windows from the raw image frames in the SRTD pipeline; and grouping the set of image windows into a batch and applying the CNN to the batch to classify the at least one target therein.

4. The computer program product of claim 1, the process further comprising:

creating a batch of full resolution image chips from the SRTD pipeline; and creating a batch of non-redundant image chips from the LRTD and LRMD pipelines.

5. The computer program product of claim 1, the process further comprising:

generating detection ROI proposal lists;

analyzing the ROI proposal lists with the CNN to create a plurality of frame detection lists, wherein the at least one frame detection list is one of the plurality of frame detection lists;

detecting targets in one of the plurality of frame detection lists, wherein the at least one target is one of the targets detected;

stacking the plurality of frame detection lists;

applying the multi-target Kalman filter to the stacked frame detection lists to generate a track list of targets to be tracked; and effecting the targets to be tracked.

6. The computer program product of claim 5 wherein analyzing the ROI proposal lists with the CNN further comprises:

analyzing region proposals from the ROI proposal lists to filter out clutter using a heatmap; and running all region proposals that pass a predetermined threshold through a non-maximal suppression routine to create the plurality of frame detection lists.

7. The computer program product of claim 5 wherein stacking the frame detection lists further comprises:

combining detections from multiple frame detection lists into detection groups based on azimuth and elevation and the detection groups having been corrected for motion;

calculating persistence of the detection groups;

calculating shape consistency from the detection groups; and generating metadata for the groups including range, position, and shape error of the at least one target detected in the frame detection lists.

8. The computer program product of claim 7 wherein the multi-target Kalman filter is only applied to detected targets in the frame detection lists that pass a predetermined threshold for persistence and shape consistency.

9. The computer program product claim 5, further comprising tracking the at least one target with the multi-target Kalman filter, wherein tracking the at least one target with the multi-target Kalman filter comprises:

tracking, continuously, the targets detected until the at least one target meets a predetermined threshold for invisibility; and deleting the at least one target from the list of targets to be tracked.

10. The computer program product of claim 5 wherein stacking the frame detection lists occurs continuously.

11. The computer program product of claim 1, wherein the process further comprises:

capturing the video from at least two detectors, wherein a first director is a red green blue (RGB) video camera and a second detector is a long-wave infrared (LWIR) video camera.

12. The computer program product of claim 1, wherein the process further comprises:

detecting a first target with a red green blue (RGB) video camera; and detecting a second target with long-wave infrared (LWIR) video camera.

13. The computer program product of claim 1, wherein the at least one target is one of a target vehicle and a dismount.

14. The computer program product of claim 1 wherein the at least one target is detected using both at least two detectors during the day and using only the at least one detector at night.

15. A method of automated target recognition and tracking comprising:

filming a video of a region of interest (ROI) with at least one video detector;

processing the video of the region of interest with at least one of a long range target detection pipeline, a long range motion detection pipeline, and a short range target detection pipeline operating on image frames of the captured video to detect at least one target in the video of the ROI, the processing including computing a horizon line using an inertial measurement unit (IMU) horizon detection filter and applying a horizon-based mask containing sky and a number of pixels below the horizon equal to a perimeter offset, and, for long range motion detection, using a frame buffer holding 10 frames and performing block-based registration and motion compensation by warping frame blocks with a geometric transform to register the images prior to motion detection;

applying a convolutional neural network to the video of the ROI to identify and classify the at least one target therein;

generating at least one frame detection list containing data about the at least one target;

calculating persistence and shape consistency of the at least one target, wherein persistence is detections-per-opportunity across consecutive frame detection lists, and shape consistency is variations in area and aspect ratio across frames; and applying a multi-target Kalman filter to detections that satisfy predetermined thresholds for persistence and shape consistency to generate a track list including at least one target to be tracked from the at least one target detected in the video of the ROI.

16. The method of claim 15 wherein filming the ROI with at least one detector further comprises:

filming the ROI with a first detector; and filming the ROI with a second detector.

17. The method of claim 16 further comprising:

filming the ROI with both the first detector and the second detector during the day; and filming the ROI with only the second detector during the night.

18. The method of claim 17 wherein the first detector further comprises:

a red green blue (RGB) video camera.

19. The method of claim 18 wherein the second detector further comprises:

a long-wave infrared (LWIR) video camera.

20. The method of claim 15 further comprising:

continuously tracking the at least one target until the target meets a predetermined threshold for invisibility; and deleting the target from the list of targets to be tracked.

* * * * *